United States Patent [19]
Ionta et al.

[11] Patent Number: 5,903,951
[45] Date of Patent: May 18, 1999

[54] MOLDED BRUSH SEGMENT

[75] Inventors: Richard Ionta, Woodbury; Donna W. Bange, Eagan; David E. Johnson, Maplewood; Mara E. Liepa, St. Paul; Richard M. Pihl, Cottage Grove, all of Minn.; David C. Roeker, Hudson, Wis.

[73] Assignee: Minnesota Mining and Manufacturing Company, St. Paul, Minn.

[21] Appl. No.: 08/739,635

[22] Filed: Oct. 30, 1996

Related U.S. Application Data

[63] Continuation-in-part of application No. 08/559,334, Nov. 16, 1995, abandoned.

[51] Int. Cl.⁶ .................................. A46B 3/04; A46B 7/08
[52] U.S. Cl. .................................. 15/180; 15/198; 451/466
[58] Field of Search .......................... 15/179, 180, 181, 15/187, 198; 451/464, 465, 466

[56] References Cited

U.S. PATENT DOCUMENTS

| | | |
|---|---|---|
| Re. 26,403 | 6/1968 | Kutik . |
| 1,712,764 | 5/1929 | Hassler . |
| 1,910,444 | 5/1933 | Nicholson . |
| 2,172,464 | 9/1939 | Anderson . |
| 2,328,998 | 9/1943 | Radford . |
| 2,682,734 | 7/1954 | Peterson . |
| 2,826,776 | 3/1958 | Peterson . |
| 2,845,648 | 8/1958 | Peterson . |
| 2,861,401 | 11/1958 | Peterson .................................. 15/188 |
| 2,878,048 | 3/1959 | Peterson . |
| 2,984,053 | 5/1961 | Peterson . |
| 3,016,554 | 1/1962 | Peterson . |

(List continued on next page.)

FOREIGN PATENT DOCUMENTS

| | | |
|---|---|---|
| 0 282 243 | 9/1988 | European Pat. Off. . |
| 0 513 798 | 11/1992 | European Pat. Off. . |
| 689655 | 6/1930 | France .................................. 15/188 |
| 2 624 773 | 6/1989 | France . |
| 6-21376 | 3/1994 | Japan . |
| 1576300 | 7/1990 | U.S.S.R. .................................. 451/466 |
| 743022 | 1/1956 | United Kingdom . |
| 1327653 | 8/1973 | United Kingdom . |

(List continued on next page.)

OTHER PUBLICATIONS

Brochure entitled *3M Diamond Resin Turtle Disc*, 3M Abrasive Systems Division, 3 pages (undated).

Alfred F. Scheider, *Developing and Emerging Trends in Brushing and Buffing*, Technical Paper, Society of Manufacturing Engineers, SME No. MR83–682, 1983.

*Thermoplastic Elastomers: A Comprehensive Review* edited by N.R. Legge, G. Holden and H.E. Schroeder; Hanser Publishers, New York, 1987.

Joseph Gaser, *Advancements in Flexible Abrasive Finishing Tools*, Technical Paper, Society of Manufacturing Engineers, SME No. MR93–135, 1993.

Joseph P. Gaser, *Applications with Abrasive Nylon Filament Tools*, Technical Paper, Society of Manufacturing Engineers, SME No. MR93–326, 1993.

(List continued on next page.)

*Primary Examiner*—Terrence R. Till
*Attorney, Agent, or Firm*—James J. Trussell

[57] ABSTRACT

A molded brush segment having a plurality of integrally molded bristles extending from a generally planar center portion. The brush segment is molded from a moldable polymer such a thermoset polymer, thermoplastic polymer, or thermoplastic elastomer. The moldable polymer preferably includes a plurality of organic or inorganic abrasive particles interspersed throughout at least the bristles, and can be interspersed throughout the brush segment. The molded brush segments can be generally circular, with the bristles extending radially outward in the plane defined by the central portion. A plurality of brush segments can be combined to form a brush assembly. Also disclosed is a method of making a molded abrasive brush and a method of refining a workpiece surface with a molded abrasive brush.

77 Claims, 11 Drawing Sheets

U.S. PATENT DOCUMENTS

| | | |
|---|---|---|
| 3,041,156 | 6/1962 | Rowse et al. . |
| 3,076,219 | 2/1963 | Peterson . |
| 3,080,637 | 3/1963 | Dutt .................................................. 15/187 |
| 3,090,061 | 5/1963 | Charvat . |
| 3,134,122 | 5/1964 | Charvat . |
| 3,146,560 | 9/1964 | Hurst . |
| 3,208,836 | 9/1965 | Biglin et al. . |
| 3,233,272 | 2/1966 | Pambello . |
| 3,260,582 | 7/1966 | Zimmer, Jr. et al. . |
| 3,270,467 | 9/1966 | Block et al. . |
| 3,307,213 | 3/1967 | Schofield . |
| 3,325,846 | 6/1967 | Goss . |
| 3,353,200 | 11/1967 | Charvat . |
| 3,372,220 | 3/1968 | Stingley . |
| 3,522,342 | 7/1970 | Nungesser et al. . |
| 3,547,608 | 12/1970 | Kitazawa . |
| 3,562,968 | 2/1971 | Johnson et al. . |
| 3,605,347 | 9/1971 | Barry ................................................ 15/180 |
| 3,618,154 | 11/1971 | Muhler et al. . |
| 3,632,320 | 1/1972 | Henmi et al. . |
| 3,667,170 | 6/1972 | MacKay, Jr. . |
| 3,670,467 | 6/1972 | Walker . |
| 3,675,263 | 7/1972 | Durham . |
| 3,696,563 | 10/1972 | Rands . |
| 3,737,694 | 6/1973 | Rabenhorst ..................................... 15/179 |
| 3,755,847 | 9/1973 | Liebscher . |
| 3,947,169 | 3/1976 | Wolff et al. . |
| 3,958,294 | 5/1976 | Thompson . |
| 3,963,459 | 6/1976 | Vinard . |
| 3,968,536 | 7/1976 | Leighton et al. ............................... 15/187 |
| 4,035,160 | 7/1977 | Taguchi . |
| 4,049,396 | 9/1977 | Hiles . |
| 4,311,489 | 1/1982 | Kressner . |
| 4,314,827 | 2/1982 | Leitheiser et al. . |
| 4,322,920 | 4/1982 | Wells . |
| 4,504,283 | 3/1985 | Charvat . |
| 4,507,361 | 3/1985 | Twilley et al. . |
| 4,585,464 | 4/1986 | Haylock et al. . |
| 4,588,420 | 5/1986 | Charvat . |
| 4,623,364 | 11/1986 | Cottringer et al. . |
| 4,627,950 | 12/1986 | Matsui et al. . |
| 4,652,275 | 3/1987 | Bloecher et al. . |
| 4,744,802 | 5/1988 | Schwabel . |
| 4,770,671 | 9/1988 | Monroe et al. . |
| 4,799,939 | 1/1989 | Bloecher et al. . |
| 4,875,259 | 10/1989 | Appeldorn . |
| 4,881,951 | 11/1989 | Wood et al. . |
| 4,945,687 | 8/1990 | Scheider et al. . |
| 4,964,883 | 10/1990 | Morris et al. . |
| 4,997,461 | 3/1991 | Markhoff-Matheny et al. . |
| 5,009,675 | 4/1991 | Kunz et al. . |
| 5,011,508 | 4/1991 | Wald et al. . |
| 5,016,311 | 5/1991 | Young et al. . |
| 5,025,596 | 6/1991 | Heyer et al. . |
| 5,042,991 | 8/1991 | Kunz et al. . |
| 5,045,091 | 9/1991 | Abrahamson et al. . |
| 5,046,288 | 9/1991 | Scheider et al. . |
| 5,077,870 | 1/1992 | Melbye et al. . |
| 5,083,840 | 1/1992 | Young et al. . |
| 5,129,197 | 7/1992 | Tyler et al. . |
| 5,152,917 | 10/1992 | Pieper et al. . |
| 5,170,593 | 12/1992 | Tyler et al. . |
| 5,174,795 | 12/1992 | Wiand . |
| 5,187,904 | 2/1993 | Tyler et al. . |
| 5,209,760 | 5/1993 | Wiand . |
| 5,213,591 | 5/1993 | Celikkaya et al. . |
| 5,216,847 | 6/1993 | Scheider et al. . |
| 5,232,470 | 8/1993 | Wiand . |
| 5,233,719 | 8/1993 | Young et al. . |
| 5,233,794 | 8/1993 | Kikutani et al. . |
| 5,279,079 | 1/1994 | Tyler et al. . |
| 5,304,223 | 4/1994 | Pieper et al. . |
| 5,316,812 | 5/1994 | Stout et al. . |
| 5,331,775 | 7/1994 | Carmichael et al. . |
| 5,363,604 | 11/1994 | Heyer . |
| 5,400,458 | 3/1995 | Rambosek . |
| 5,423,718 | 6/1995 | Tyler et al. ............................. 451/466 |
| 5,427,595 | 6/1995 | Pihl et al. . |
| 5,443,906 | 8/1995 | Pihl et al. . |
| 5,454,752 | 10/1995 | Sexton et al. . |
| 5,460,883 | 10/1995 | Kelly et al. . |
| 5,476,416 | 12/1995 | Kodate . |
| 5,500,273 | 3/1996 | Holmes et al. . |
| 5,518,794 | 5/1996 | Barber et al. ............................. 15/179 |
| 5,525,100 | 6/1996 | Kelley et al. . |

FOREIGN PATENT DOCUMENTS

| | | |
|---|---|---|
| 1480096 | 7/1977 | United Kingdom . |
| 2043501 | 10/1980 | United Kingdom . |
| 2280142 | 1/1995 | United Kingdom . |
| 2281075 | 2/1995 | United Kingdom . |
| WO 95/23539 | 9/1995 | WIPO . |

OTHER PUBLICATIONS

Prasad S. Mahadev and Richard C. Sawyer, Jr., Tufted Nylon Abrasive Filament (TNAF) Disc Brushes–A New Alternative to Deburring, Edge Radiusing and Finishing Problems, Technical Paper, Society of Manufacturing Engineers, SME No. MR93–317, 1993.

J.H. Watts, Abrasive Monofilaments–Critical Factors that Affect Brush Tool Performance, SME Technical Paper MR88–138, Society of Manufacturing Engineers, Dearborn, Michigan, 1988.

Technical Data Sheet entitled Fatigue Resistance and Some of the Factors That Affect Flex Life of Brush Filling Materials, Bulletin No. 6, E.I. Du Pont de Nemours & Co., Wilmington, Delaware, Feb. 1978.

Brochure entitled *Elast–Hone*™ from EngineersExpress, Medway, Mass (undated).

Brochure entitled *Wolfhead Sanding and Polishing Wheels*, Bulletin W–3 Grinding & Polishing Machinery Corporation, Indianapolis, IN; Oct. 1988.

Brochure entitled *Horizontal–Vertical Moulding Sander*, Bulletin T–11, Grinding & Polishing Machinery Corporation, Indianapolis, IN; Oct. 1988.

Brochure entitled *Fladder® System*, Hansen & Hundebol, Inc., Atlanta, GA; 1993.

   
Fig. 7a  Fig. 7b  Fig. 7c  Fig. 7d
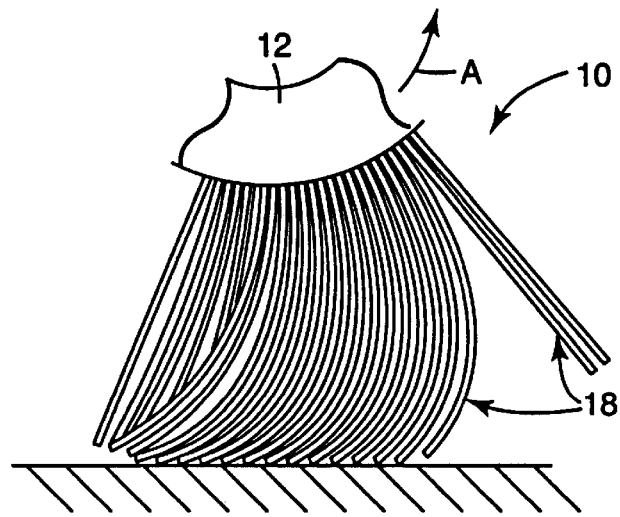
Fig. 8
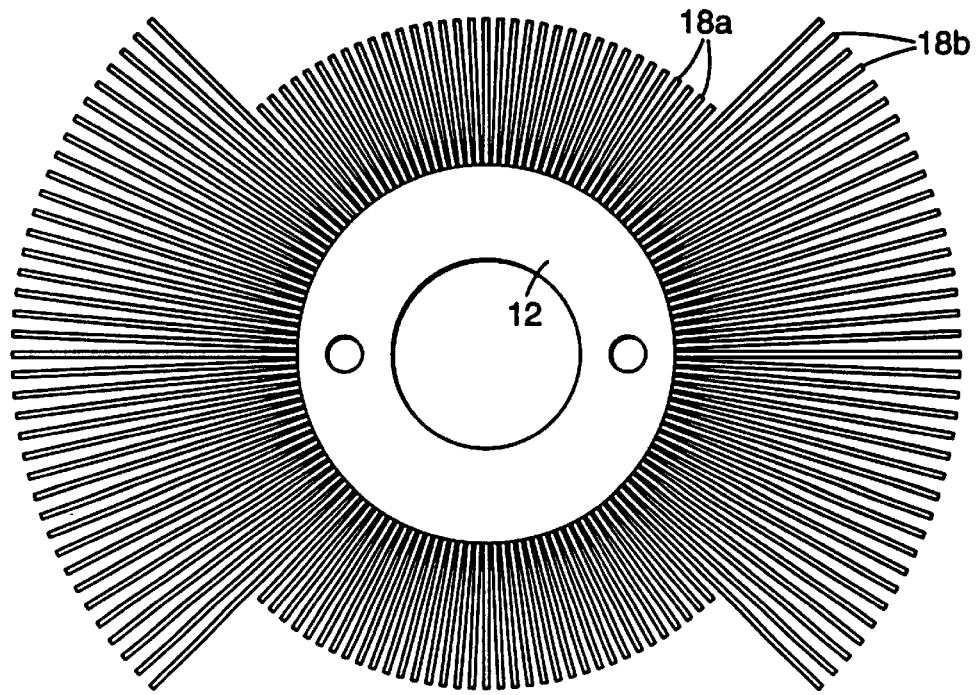
Fig. 9

MOLDED BRUSH SEGMENT

This is a continuation-in-part of U.S. patent application Ser. No. 08/559,334, filed Nov. 16, 1995, now abandoned.

TECHNICAL FIELD

The present invention relates generally to a molded brush segment having a plurality of generally radial bristles unitary with a central region, and more particularly to an abrasive brush segment made by injection molding a mixture of a moldable polymer and optional abrasive particles.

BACKGROUND OF THE INVENTION

Brushes have been used for many years to polish, clean, and abrade a wide variety of substrates. These brush products typically have a plurality of bristles that contact the substrate. Abrasive particles can be added to bristles to increase their abrasiveness. There are many manufacturing steps necessary to manufacture a conventional abrasive brush having bristles which contain abrasive particles. A mixture of abrasive particles and a thermoplastic binder may be combined and then extruded to form a bristle. The bristle is then cut to the desired length. A plurality of these bristles are then mechanically combined to form a brush segment. Next, a plurality of these brush segments may be installed on a hub or plate to form a brush.

One example of such a brush is disclosed in U.S. Pat. No. 5,045,091, "Method of Making Rotary Brush With Removable Brush Elements" (Abrahamson et al.). In Abrahamson et al., a plurality of abrasive bristles are mechanically clamped together and a root system is installed to form a brush segment. A plurality of these brush segments is installed on a rotary hub to provide a radial brush. Another arrangement for mechanically mounting bristles on a hub to form a radial brush segment is disclosed in U.S. Pat. No. 5,233,719, "Apparatus and Brush Segment Arrangement for Finishing Wheel Brushes" (Young et al.). Young et al. teach a brush segment comprising a substrate with a carpet of bristles mounted on one side of the substrate, by means of a polymeric resin for example, and a root system extending from the opposite side of the substrate. The individual brush segments are adapted for mounting in longitudinal slots in a cylindrical hub. U.S. Pat. No. 5,400,458 (Rambosek) teaches a brush segment having a plurality of bristles embedded in a polymeric base portion. A root means for attaching the segment to a hub can be integrally molded with the base.

Co-pending U.S. patent application Ser. No. 08/431,910 (Johnson et al.), issued as U.S. Pat No. 5,679,067. discloses an integrally molded abrasive brush for rotary tools, comprising a generally planar flexible base having a first side and a second side, and a plurality of bristles extending from the first side of the base. The bristles have an aspect ratio of at least 2 and are integrally molded with the base. The molded abrasive brush comprises a moldable polymeric material which includes abrasive particles interspersed throughout at least the bristles. The bristles extend generally perpendicular to the base, parallel to the axis of rotation of the molded abrasive brush. In a preferred embodiment, the bristles contact the workpiece at the juncture of the leading edge of the tip of the bristle and the outermost portion of the side surface of the bristle.

U.S. Pat. No. 5,427,595 (Pihl et al.) discloses an extruded abrasive filament including a first elongate filament component having a continuous surface throughout its length and including a first hardened organic polymeric and a second elongate filament component coterminous with the first elongate filament component, including a second hardened organic polymeric material in melt fusion adherent contact with the first elongate filament component along the continuous surface. The second hardened organic polymeric material can be the same or different than the first hardened organic polymeric material. At least one of the first and second hardened organic polymeric materials includes a thermoplastic elastomer having abrasive particles adhered therein. Also disclosed is an abrasive article comprised of at least one abrasive filament mounted to a substrate such as a hub adapted to be rotated at a high rate of revolution.

U.S. Pat. No. 5,460,883 (Barber et al.) discloses a composite abrasive filament which includes at least one preformed core at least partially coated with a thermoplastic elastomer having abrasive particles dispersed and adhered therein, the thermoplastic elastomer and abrasive particles together comprising a hardened composition. The composite abrasive filament has a hardened composition over at least a portion, preferably over the entire surface of at least one preformed core. The preformed core is formed in a step separate from and prior to one or more coating steps, one of which coats the preformed core with abrasive-filled thermoplastic elastomer.

U.S. Pat. No. 3,618,154, "Brush," Muhler et al.), discloses brushes, and more particularly an integrally molded, one-piece brush, especially a toothbrush, in which the plastic material from which the brush is molded incorporates up to about 30% by weight of an abrasive material, especially a dental abrasive material. Muhler states that, depending upon the individual use to which the brush may be put, the abrasive component thereof may be omitted. Without providing any details as to the configuration of such an embodiment, Muhler states that a relatively thin elongated brush head with bristles formed thereon could be attached to a wheel and thereby serve as a buffing brush.

U.S. Pat. No. 3,233,272, "Rotary Brush," (Pambello), discloses brushes, particularly rotary brushes of the annularly or spirally arranged brush strip type which are primarily adapted for heavy duty such as brushing paved streets, sidewalks, concrete flooring and the like. In one embodiment, the rotary brush of Pambello comprises a cylindrical rotatable structure, a brushing element formed of a unitary strip of yieldable plastic material spirally arranged on the drum, the strip having a lengthwise extending base and having vane means extending outwardly from the base and formed with a tip at the outer end thereof. Alternatively, there may be a number individual strips circularly arranged on the drum. The brush strip of Pambello may be formed of plastic materials by molding or extruding and cutting operations.

It is seen that there is a need to provide a radial abrasive brush segment, and a brush comprising the brush segments, that is easily and inexpensively manufactured, and which provides suitable durability and abrading characteristics.

SUMMARY OF THE INVENTION

The present invention relates to a molded radial brush segment, and more particularly to a molded abrasive radial brush segment. As used herein, the term "brush segment" refers to an article comprising a center portion and plurality of bristles extending outwardly from the center portion. The molded brush segment is capable of being used alone or in combination with two or more molded brush segments assembled side by side to make a brush assembly of any desired width. The molded brush segment itself may comprise a 360° brush segment, or smaller ring sectors comprising, for example, a 90° ring sector. The ring sectors may be combined as necessary in an assembly of ring sectors to form a 360° brush segment.

One aspect of the present invention presents an integrally molded brush segment comprising a generally planar center portion having an outer edge and a plurality of bristles extending from the outer edge of the center portion. The bristles have an aspect ratio of at least 2 and are integrally molded with the center portion. The molded brush segment comprises a moldable polymeric material. In one variation, the moldable polymeric material includes abrasive particles interspersed throughout. The abrasive particles can comprise inorganic or organic abrasive particles. The moldable polymeric material can comprise a thermoplastic polymer, a thermosetting polymer, a thermoplastic elastomer, or combinations thereof. The thermoplastic elastomer can be selected from the group consisting essentially of: polyester-based thermoplastic elastomer, nylon-based thermoplastic elastomer, and polyurethane-based thermoplastic elastomer.

The bristles of the above molded brush segment can have an aspect ratio of at least 10. The bristles can each comprise a root adjacent the center portion and a tip opposite the base, and the bristles can be tapered so as to be wider at the root than at the tip. The bristles can be coplanar with the center portion. The bristles can be coplanar with the center portion and extend radially from the outer edge of the center portion. The bristles can be evenly angularly spaced about the outer edge. The bristles can be oblique to the plane of the center portion. In one preferred embodiment, the center portion is circular, and the bristles are oblique to a radial plane of the circular center portion.

The above molded brush segment can also include an attachment means provided on the center portion for attaching the brush segment to a drive means. In one embodiment of the brush segment, the center portion includes an inner edge. In one version, the attachment means includes a root integrally molded with the molded brush segment. The root extends from the inner edge and includes a neck portion adjacent the inner edge and a base portion remote from the inner edge, the base portion being wider than the neck portion. In another version, the attachment means comprises a keyway formed in the inner edge, the keyway configured to engage with a corresponding key formed in a drive means.

In another embodiment, the inner edge and outer edge of the center portion comprise concentric circles bounding the center portion. In one version of this embodiment, the inner edge is configured to accept a drive shaft therethrough, and the center portion further includes a mounting hole therein for accepting a locking rod therethrough.

In another embodiment of the molded brush segment, the outer edge is circular, and the attachment means comprises a threaded stud integrally molded with the center portion, and located at the center of the center portion.

In another embodiment of the molded brush segment, the center portion includes an inner edge and an outer edge, each comprising arcuate circular segments comprising an angular size equal to one another and no greater than 180°. The center portion also includes a first radial edge extending from a first end of the inner edge to a first end of the outer edge, and a second radial edge extending from a second end of the inner edge to a second end of the outer edge. In other versions, the angular size equals 180°, 120°, or 90°.

Another aspect of the present invention presents a brush assembly. The brush assembly comprises a) a plurality of molded brush segments; and b) rotary drive means for rotating the plurality of molded brush segments, wherein each of the molded brush segments are mounted to the drive means by the attachment means so that each of the generally planar center portions are parallel to one another. Each of the molded brush segments can be in contact with an adjacent molded brush segment.

In one version of the above brush assembly, the drive means comprises a cylindrical shaft, the inner and outer edges are both circular, the inner edge defines a circular opening for accepting the shaft therethrough, and the center portion extends for 360° around the shaft. In another version of the brush assembly, the attachment means comprises a root integrally molded with the molded brush segment, the root extending from the inner edge and including a neck portion adjacent the inner edge and a base portion remote from the inner edge, the base portion being wider than the neck portion, and wherein the shaft includes a slot configured to accept the root. In this version, the brush segments may be 360°, or a plurality of smaller ring sectors combined to form a 360° segment. In another version of the brush assembly, the attachment means comprises a keyway formed in the inner edge, and the shaft includes a key configured to engage the keyway. In yet another version of the brush assembly, the attachment means comprises a mounting hole formed in the center portion and a locking rod extending therethrough. In a further version of the brush assembly, the attachment means comprises a root integrally molded with the molded brush segment, the root extending from the inner edge and including a neck portion adjacent the inner edge and a base portion remote from the inner edge, the base portion being wider than the neck portion, and wherein the shaft includes a slot configured to accept the root.

Still another aspect of the present invention presents a method of making a molded brush segment. The method comprises the steps of:

a) heating a moldable polymer to form a flowable material; and thereafter b) injecting the flowable material under pressure into a mold to form a brush segment. The method can include the further step of, prior to step b), mixing a moldable polymer with abrasive particles to form a mixture.

Still a further aspect of the present invention presents a method of refining a workpiece surface, comprising:

1) providing a brush assembly comprising a plurality of molded abrasive brush segments and rotary drive means for rotating the plurality of molded brush segments, 2) contacting the bristles against the workpiece surface; and 3) rotating the plurality of molded abrasive brush segments with the drive means to thereby refine the workpiece surface with the bristles. In one version of the method, step 3) comprises removing workpiece material from the workpiece surface, and the abrasive particles comprise inorganic abrasive particles. In another version of the method, the workpiece surface includes a foreign material thereon, the abrasive particles in the brush segments comprise organic abrasive particles, and step 3) comprises removing foreign material from the workpiece surface without removing workpiece material.

BRIEF DESCRIPTION OF THE DRAWINGS

The present invention will be further explained with reference to the appended FIG., wherein like structure is referred to by like numerals throughout the several views, and wherein:

FIGS. 7a–7d are cross sectional views of various embodiments of the bristle of the brush segment of the present invention, taken along line 7–7 of FIG. 1;

FIG. 8 is a partial elevation view of the brush segment of FIG. 1 in operation;

FIG. 9 is a plan view of a fourth embodiment of a radial abrasive brush segment according to the present invention;

DETAILED DESCRIPTION OF TEE INVENTION

This invention pertains to a molded radial brush segment and in particular an abrasive brush segment, a method of making a molded radial brush segment and in particular an abrasive brush segment, a brush assembly and particularly an abrasive brush assembly, and a method of using the aforementioned brushes.

Figure 1:
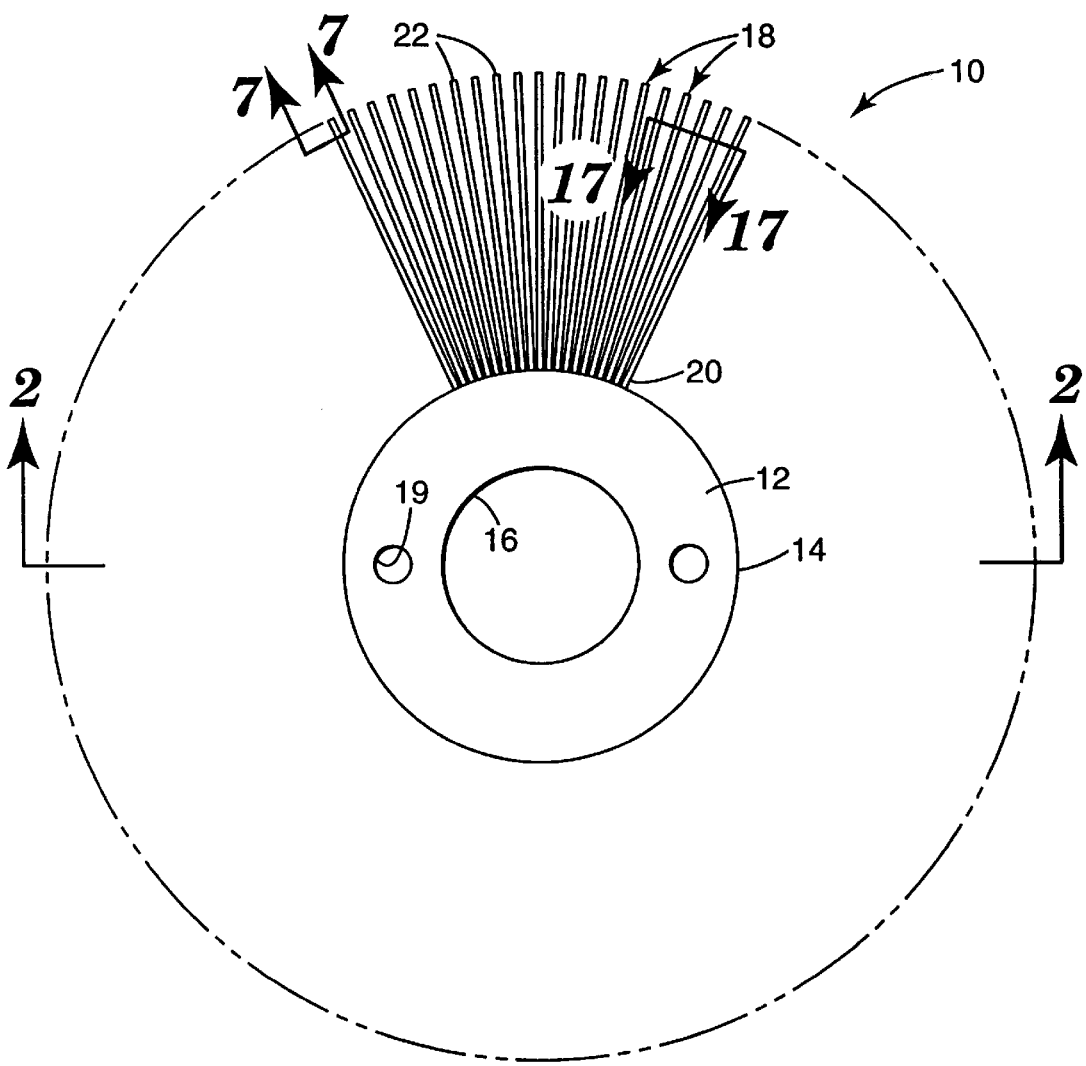
FIG. 1 is a plan view of a first embodiment of a radial abrasive brush segment according to the present invention.
Figure 2:
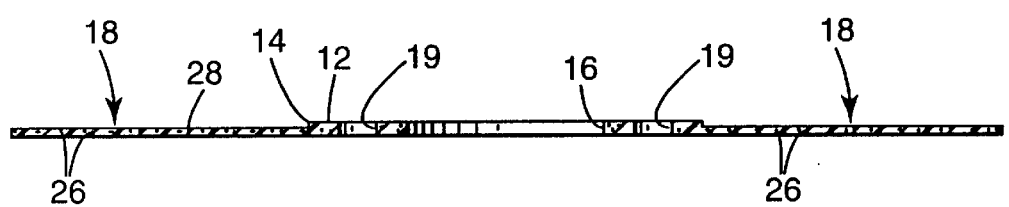
FIG. 2 is a cross sectional view of the brush segment of FIG. 1, taken along line 2—2.

Referring to FIGS. 1 and 2, abrasive brush segment 10 comprises a center portion 12 having outer edge 14 and inner edge 16. A plurality of bristles 18 project outwardly from outer edge 14, beginning at bristle roots 20 and ending at bristle tips 22. There may be spaces between bristle roots 20 in which outer edge 14 of center portion 12 is exposed. Alternatively, adjacent bristles may adjoin one another at roots 20. Brush segment 10 is integrally molded such that bristles 18 and center portion 12 are continuous with one another. In one preferred embodiment, brush segment 10 is an abrasive brush segment which comprises a generally homogenous composition of abrasive particles 26 in a moldable polymer 28. In another preferred embodiment, brush segment 10 comprises a moldable polymer 28 substantially free of abrasive particles.

Figure 3A:
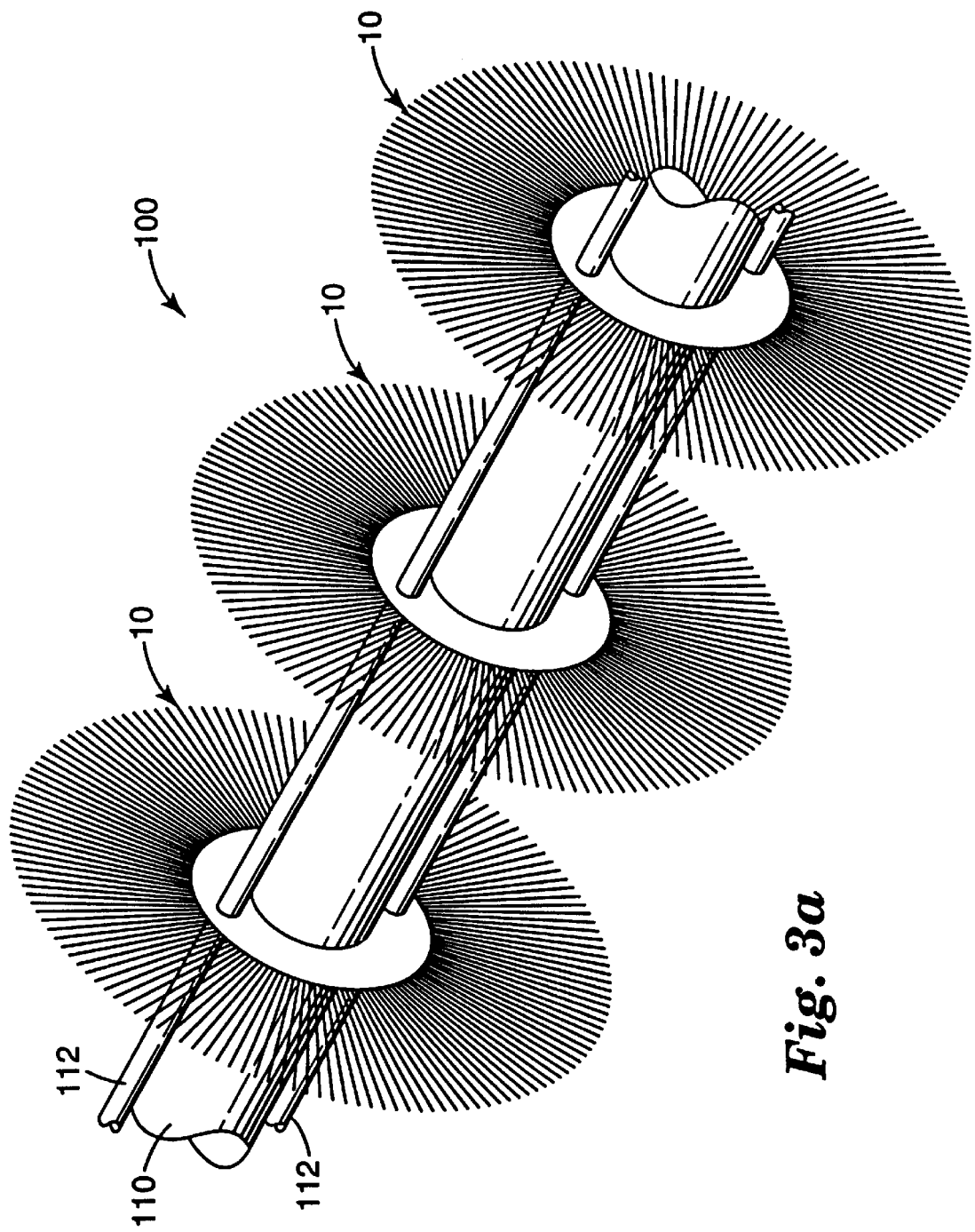
FIG. 3a is an isometric view of a plurality of brush segments of FIG. 1 being assembled onto a shaft to form a brush assembly.
Figure 3B:
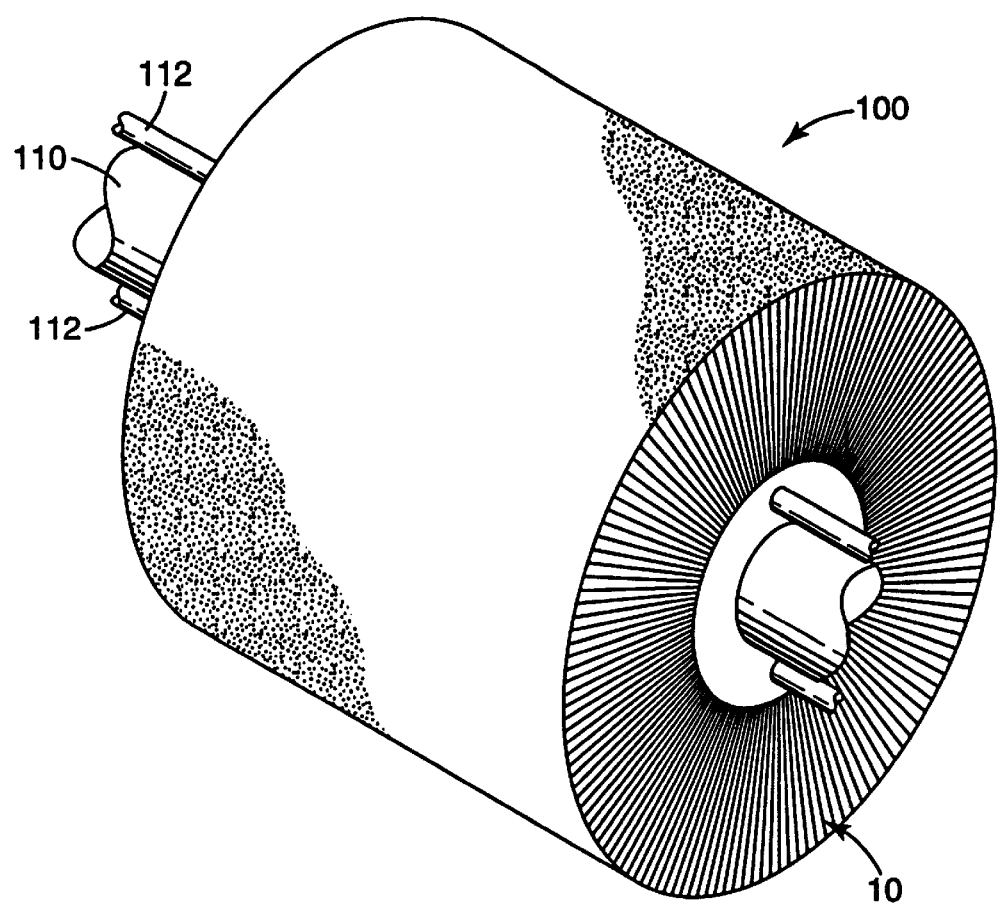
FIG. 3b is a view like FIG. 3a, with the individual brush segments adjoining one another.

As illustrated in FIG. 3a, a plurality of brush segments 10 can be assembled onto main shaft 110 to form a brush assembly 100. Any number of segments 10 may be assembled together to provide an assembly 100 of any desired width. Preferably, the brush segments 10 are adjacent one another such that there is essentially no space between the brush segments, as illustrated in FIG. 3b. Alternatively, the brush segments 10 may be assembled onto to shaft 110 so as to have space between adjacent brush segments as illustrated in FIG. 3a. For example, there may be 5 to 10,000 brush segments 10 assembled together to form assembly 100, although more or less may be used as desired. A means for providing segment-to-segment engagement may be included to reduce or eliminate rotation of adjacent brush segments relative to one another. Such engagement means can include, for example, an interengaging saw tooth pattern or hole and dimple pattern on the surfaces of center portion 12.

The materials, manufacturing process and brush segment configuration will depend upon the desired refining application. As used herein, the term "refine" includes at least one of the following: remove a portion of a workpiece surface; impart a surface finish to a workpiece; descale a surface; deburr a surface; clean a workpiece surface, including removing paint or other coatings, gasket material, corrosion, oil residue, or other foreign material or debris; or some combination of the foregoing. In some applications, it may be preferred to provide aggressive abrasive characteristics, in which case the brush segment may comprise abrasive particles, larger size abrasive particles, harder abrasive particles, a higher abrasive particle to binder ratio, or some combination of the above. In other applications, it may be preferred to provide a polish type finish to the surface being refined, or to clean a surface without removing surface material itself, in which case the brush segment may employ no abrasive particles, smaller abrasive particles, softer abrasive particles, lower abrasive particle to binder ratio, or some combination of the above. It is possible to employ abrasive particles 26 of varied composition and hardness to obtain the desired abrading characteristics.

Center portion

Figure 4:
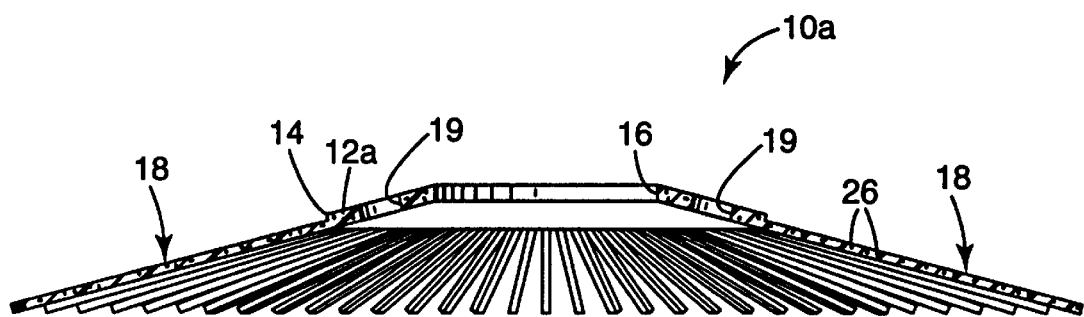
FIG. 4 is a cross sectional view of a second embodiment of a radial abrasive brush segment according to the present invention.

In the embodiment illustrated in FIG. 1, center portion 12 is a continuous circumferential portion which is generally planar. It is also within the scope of the invention to have a contoured or curved center portion. For example, center portion 12 may be convex, concave, or conical in shape. As illustrated in FIG. 4, center portion 12a is conical, with the bristles 18 extending parallel to the conical surface defined by the center portion.

Brush segment 10 may optionally have an attachment means on center portion 12, such as a channel, keyway, or a root to mechanically join several brush segments together on a drive means to provide a brush assembly. As illustrated in FIG. 1, center portion 12 includes two mounting holes 19, through which a locking rod may be inserted. A brush assembly 100, illustrating two locking rods 112 inserted through holes 19 is illustrated in FIG. 3a. Shaft 110 and locking rods 112 may then be attached to a suitable rotary drive means.

Center portion 12 can preferably have a thickness of from about 0.5 to 25 mm, more preferably from about 1.0 to 10 mm, still more preferably from about 1.5 to 6 mm, and most preferably from about 1.5 to 3 mm. Center portion 12 is preferably circular as illustrated in FIG. 1. The diameter of the outer edge 14 of center portion 12 is preferably from about 2.5 to 61.0 cm (1.0 to 24.0 in), although smaller and larger center portions are also within the scope of the invention. In one preferred embodiment, the center portion 12 is of a suitable material and thickness to provide a flexible center portion 12, which helps maintain more bristles in contact with an uneven or irregular workpiece. The center portion 12 preferably is capable of flexing at least 10°, more preferably at least 20°, and still more preferably at least 45° without damage or substantial permanent deformation to the center portion. Center portion shapes other than circular are also within the scope of the invention, including, but not limited to, oval, rectangular, square, triangular, diamond, and other polygonal shapes, as are relatively rigid or inflexible center portions.

Figure 5:
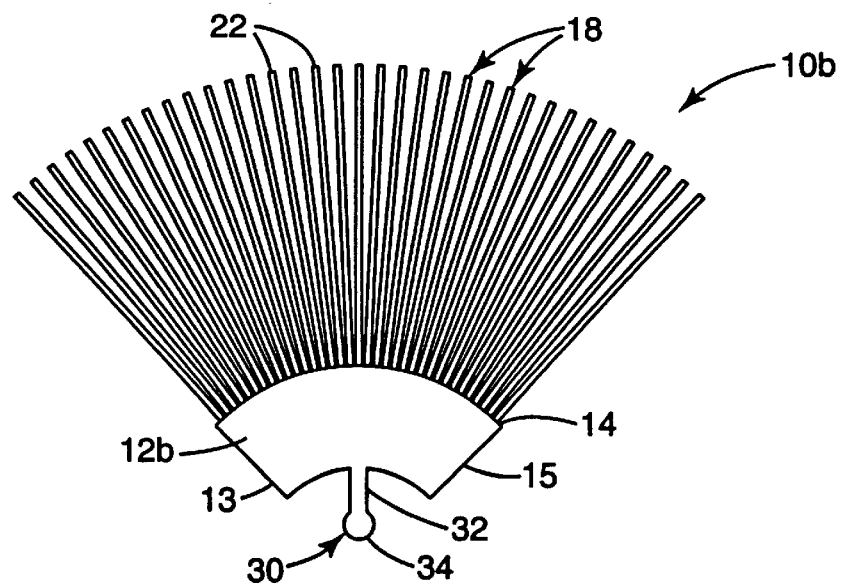
FIG. 5 is a plan view of a third embodiment of a radial abrasive brush segment according to the present invention.
Figure 6:
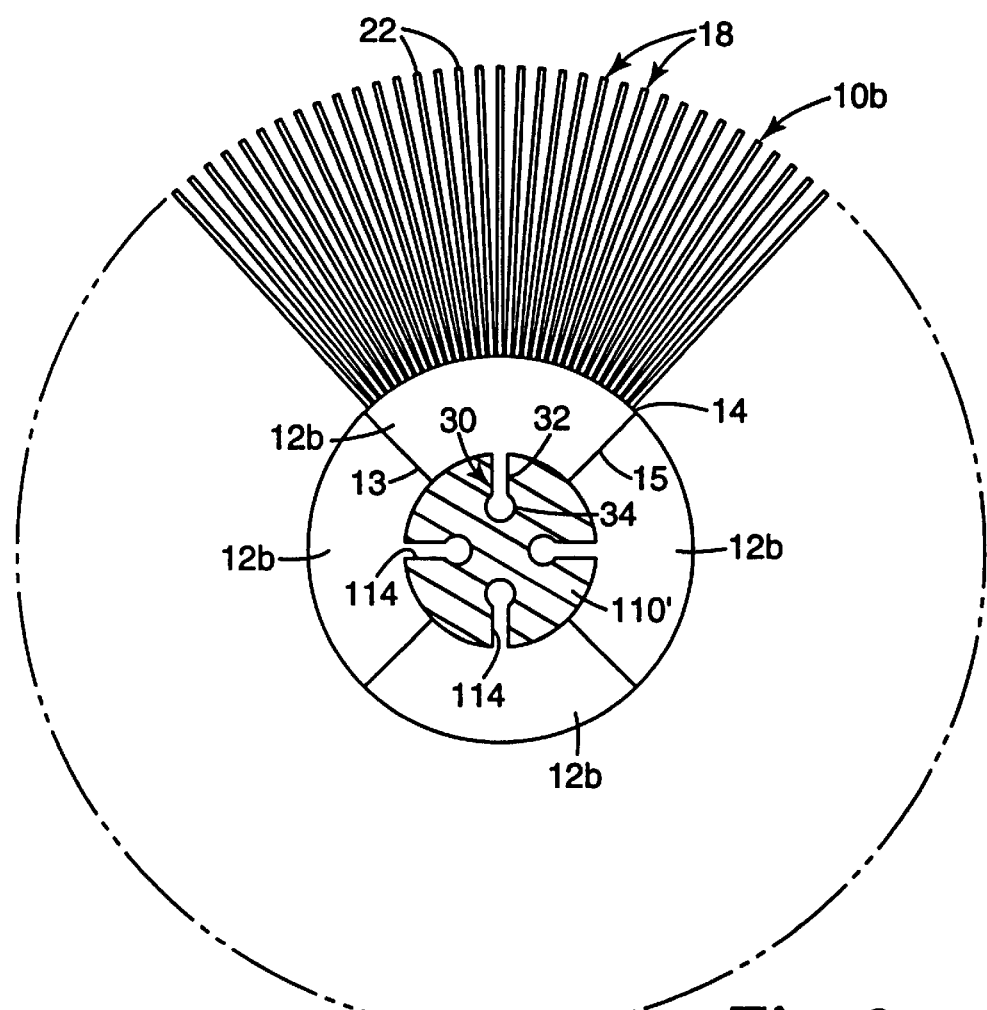
FIG. 6 is an end view of a plurality of brush segments of FIG. 5 assembled together on a shaft.

Center portion 12b may alternately be a ring sector as illustrated in FIG. 5. In this embodiment, center portion 12b is bounded on each side by radial edges 13 and 15. Preferably, the ring sector is of an angular width that allows for an integer number of ring sectors to be assembled into a circumferential brush segment. For example, four 90° ring sectors 10b are readily arranged to make a 360° circumferential brush segment as illustrated in FIG. 6.

Preferably, center portion 12 is molded integrally with the bristles 18 to provide a unitary brush segment. Thus, no adhesive or mechanical means is required to adhere bristles 18 to center portion 12. It is preferred that center portion 12 and bristles 18 are molded simultaneously. To make an abrasive brush segment, there may be a single mixture of abrasive particles 26 and moldable polymer 28 placed in the mold in a single injection process. In such an embodiment, the abrasive brush segment comprises a generally homogenous composition throughout. However, due to the molding process, the abrasive particle/binder mix may not be perfectly homogeneous. For example, as the polymer and abrasive mix is injected into the mold, the narrow bristle cavities may cause more polymer to initially cool adjacent the inside of the bristle cavity near the base, forcing a mix having a somewhat higher concentration of abrasive particles toward tip 22 of the bristle.

Alternatively, there may be two or more insertions of a moldable polymer 28 to the mold. For example, one insertion may contain a mixture of moldable polymer 28 and abrasive particles 26, located primarily in bristles 18. A second insertion may contain moldable polymer 28 without abrasive particles 26, or with fewer or a different type of abrasive particles, located primarily in center portion 12 of brush segment 10. It is also within the scope of this invention to have two insertions, both containing abrasive particles. The first insertion may have abrasive particles of a certain size, material, and/or hardness, while the second insertion may include different abrasive particles. During abrading, the abrasive particles nearer tip 22 are used first, and then the abrasive particles nearer root 20 are used.

Figure 17:
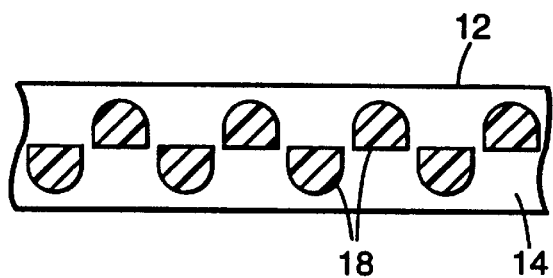
FIG. 17 is a sectional view taken along line 17—17 of FIG. 1; illustrating an alternate embodiment of the brush segment made by the mold of FIG. 16.

Bristles 18 extend from outer edge 14 of center portion 12, beginning at root and ending at tips 22 remote from center portion 12. In one preferred embodiment, bristles 18 extend radially from the outer edge 14 of the center portion 12, and are coplanar with the center portion 12. For ease of molding (described more fully below), it is preferable that there is a single row of bristles 18 arranged around the outer edge 14. Alternatively, a double row of bristles may be formed, as illustrated in FIG. 17. Bristles 18 preferably extend from outer edge 14 of center portion 12 in a plane parallel to the plane of center portion 12, whether center portion 12 is planar as illustrated in FIG. 2, or conical as illustrated in FIG. 4. Alternatively, bristles 18 may extend from outer edge 14 of center portion 12 at any oblique angle relative to the plane of the center portion.

Bristles 18 may have any cross sectional area, including but not limited to, circular, star, half moon, quarter moon, oval, rectangular, square, triangular, diamond, or other polygonal shape. Some exemplary cross sections are illustrated in FIGS. 7a through 7d. In one preferred embodiment, bristles 18 comprise a constant cross section along the length of bristle 18. In other embodiments, bristles 18 will have a non-constant or variable cross section along the length of the bristle.

Bristles 18 may be tapered such that the cross sectional area of the bristle decreases in the direction away from root 20 towards tip 22. Tapered bristles 18 can have any cross section as described above. Bristles 18 are subjected to bending stresses as brush segment 10 is rotated against a workpiece as illustrated in FIG. 8. These bending stresses are highest at the root 20 of bristles 18 (at outer edge 14). Therefore, a tapered bristle is more able to resist bending stresses than a bristle of constant cross sectional area. Bristles 18 can have a taper along the entire length, or can have a tapered portion adjacent the root 20 and a constant cross sectional area for the remainder of the bristle. The taper can comprise any suitable angle. Furthermore, brush segment 10 can include a fillet radius at the transition between root 20 of bristle 18 and outer edge 14 of center portion 12.

Bristles 18 comprise an aspect ratio defined as the length of bristle 18 measured from outer root 20 to tip 22, divided by the width of the bristle. In the case of a tapered bristle, the width is defined as the average width along the length for purposes of determining the aspect ratio. In the case of non-circular cross section, the width is taken as the longest width in a given plane, such as the corner-to-corner diagonal of a square cross section. The aspect ratio of bristles 18 is preferably at least 2, more preferably from about 5 to 100, and still more preferably from about 50 to 75. The size of bristles 18 can be selected for the particular application of brush segment 10 and brush 100. The length of bristles 18 is preferably from about 0.2 to 50 cm, more preferably from about 1 to 25 cm, and still more preferably from about 5 to 15 cm. The width of the bristles 18 is preferably from about 0.25 to 10 mm more preferably from about 0.5 to 5.0 mm, still more preferably about 0.75 to 3.0 mm, and most preferably from about 1.0 to 2.0 mm. The width of bristles 18 can be the same as or different from the thickness of center portion 12. In one preferred embodiment, all of the bristles 18 have the same dimensions. Alternatively, bristles 18 on a brush 100 comprising a plurality of brush segments 10 may have different dimensions such as different lengths, widths or cross sectional areas. For example, FIG. 9 illustrates brush segment 10 having two groups of short bristles 18a and two groups of long bristles 18b. With respect to the embodiment illustrated in FIG. 6, it is possible to arrange ring sector segments 10b, each having bristles of different length. With respect to the brush assembly 100 illustrated in FIGS. 3a and 3b, it is possible to employ adjacent brush segments 10 having different bristles.

The density and arrangement of bristles 18 can be chosen for the particular application of brush segment 10 and brush 100. Bristles 18 preferably are arranged uniformly around the outer edge 14 of center portion 12. Alternatively, bristles 18 can be arranged in groups with spaces between the groups, and can be oriented in the plane of center portion 12 other than radially outward, that is, at a non-zero angle relative to the radius of center portion 12. Accordingly, brush segment 10 may have a portion of outer edge 14 which does not include any bristles 18. The bristles may be present over only a portion of outer edge 14 of center portion 12, or substantially the entire outer edge 14. Bristles 18 may or may not abut adjacent bristles as desired.

The material, length, and configuration of the bristles are preferably chosen such that bristles 18 are sufficiently flexible to aid in refining uneven or irregular workpieces. The bristles 18 are preferably capable of bending at least 25°, more preferably at least 45°, still more preferably at least 90°, and most preferably about 180°, without damage or substantial permanent deformation to the bristles.

It is possible to reinforce the bristles 18 with any suitable structure. For example, it is possible to place a reinforcing fiber or wire in the bristle mold cavities, and inject the moldable polymer 28 around the reinforcing wire. This will result in a bristle 18 having a reinforcing wire or fiber embedded within it.

Attachment Means

Figure 10:
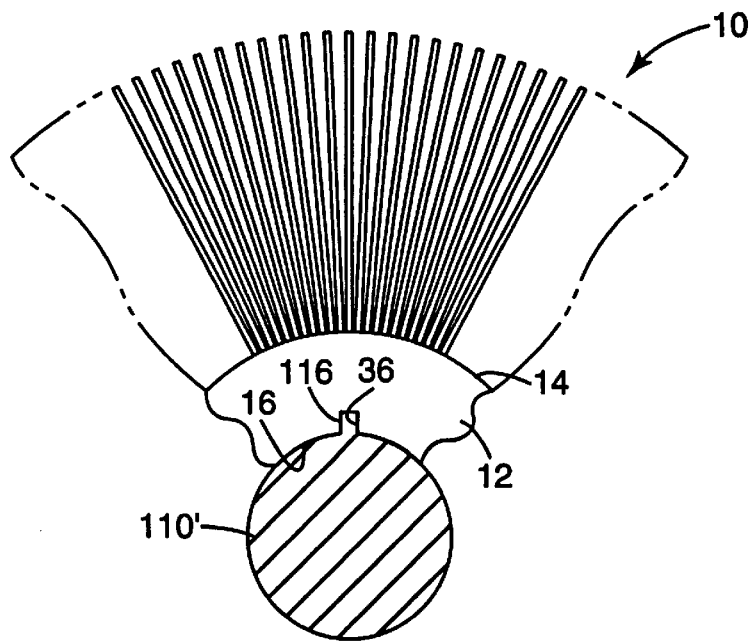
FIG. 10 is a partial plan view of a brush segment mounted on a shaft illustrating an alternate embodiment of an attachment means.

Brush segment 10 preferably includes an attachment means for joining several brush segments together to form a brush assembly, or for attaching one or more brush segments 10 to a support means such as a hub or shaft. As illustrated in FIGS. 1 and 3, center section 12 has inner edge 16 configured to engage with a shaft 110. Center section 12 also includes mounting holes 19 for accepting locking rods 112. An alternate attachment means is illustrated in FIGS. 5 and 6, in which center portion 12b includes mounting root 30 comprising a neck 32 and base 34 configured to engage with a complementary configured slot 114 in shaft 110'. The arrangement illustrated in FIGS. 5 and 6 is well suited for brush segments which comprise ring sectors 12b. The mounting root 30 can support the ring sector in the radial direction during operation. Mounting root 30 can also be used with 360° brush segments 10, 10a. A further embodiment of an attachment means is illustrated in FIG. 10, in which center portion 12 includes a channel or keyway 36 configured to engage a suitably configured key 116 in shaft 110".

In one preferred embodiment of the brush segment illustrated in FIGS. 1–2, the center portion 12 has an outer diameter at edge 14 of approximately 10 cm (4 inches), an inner diameter at edge 16 of approximately 5 cm (2 inches), and a thickness of approximately 2.0 mm (0.08 inches), with 144 bristles 18 extending radially outward from edge 14 in the plane of the center portion 12. Each bristle 18 is approximately 7.5 cm (3 inches) long and tapers from approximately 2.0 mm (0.08 inches) thick at the root to approximately 1.5 mm (0.06 inches) thick at the tip, with a cross section generally as illustrated in FIG. 7c.

Figure 11:
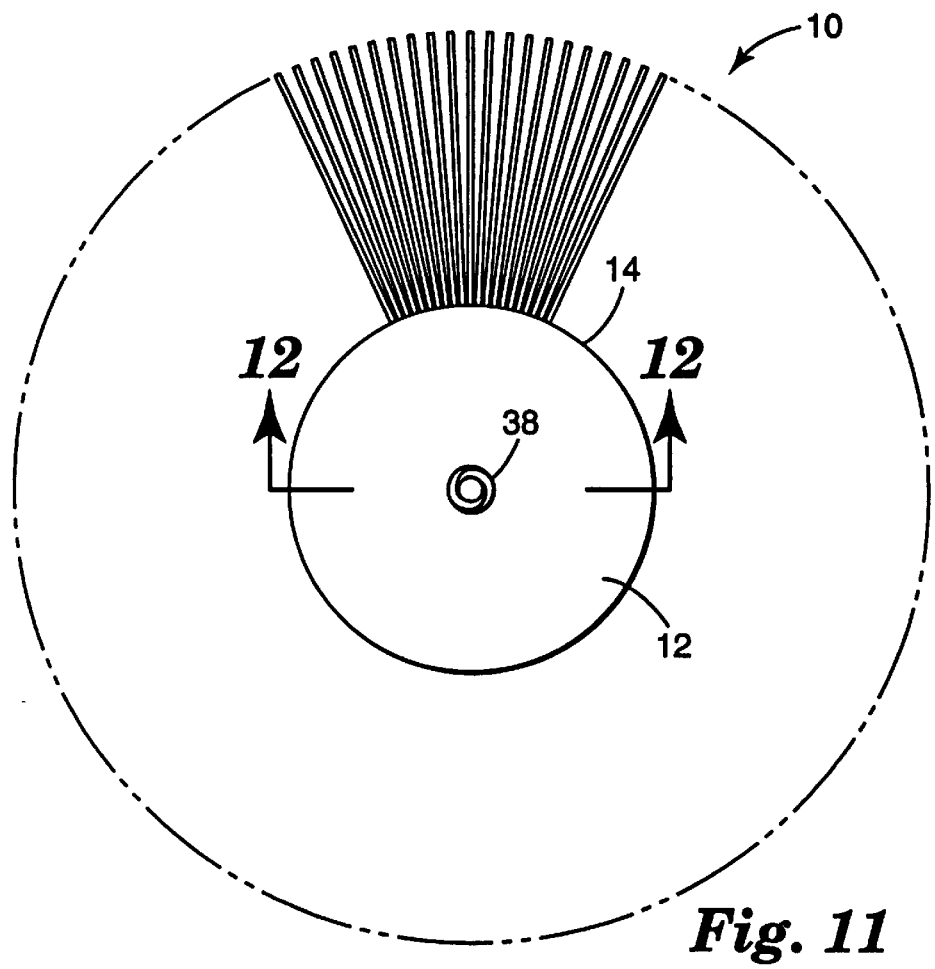
FIG. 11 is a plan view of a brush segment illustrating a farther embodiment of an attachment means.
Figure 12:
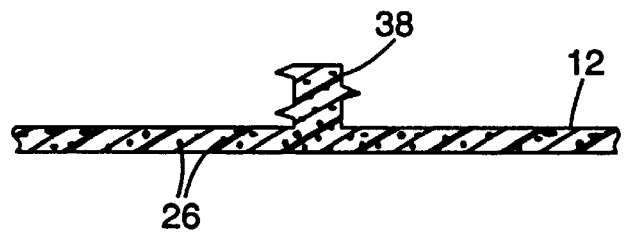
FIG. 12 is a cross sectional view of the brush segment of FIG. 11, taken along line 12—12.

Still another alternate embodiment of the attachment means is illustrated in FIGS. 11 and 12. In this embodiment, center portion 12 is continuous, and does not include an opening defined by inner edge 16. The attachment means 38 is provided at the center of center portion 12. This type of attachment means is suitable for use with 360° circular brush segments. Suitable attachment means 38 are described in U.S. Pat. Nos. 3,562,968; 3,667,170; and 3,270,467 the entire disclosures of all of which are incorporated herein by reference. One preferred attachment means is the integrally-molded threaded stud adapted for screw-type engagement with a rotary tool as taught by U.S. Pat. No. 3,562,968. It is preferred that the attachment means 38 is molded integrally with the center portion 12 and is centered relative to the center portion 12 for proper rotation of brush segment 10. The attachment means 38 may be made from the same material as the rest of the brush segment 10, and may contain abrasive particles 26. Alternatively, the attachment means 38 may be made from a separate injection of moldable polymer 28 without abrasive particles 26.

In one preferred embodiment of the brush segment illustrated in FIGS. 11–12, the center portion 12 has an outer diameter at edge 14 of approximately 10 cm (4 inches) and a thickness of approximately 2.0 mm (0.08 inches), with 144 bristles 18 extending radially outward from edge 14 in the plane of the center portion 12. Each bristle 18 is approximately 7.5 cm (3 inches) long and tapers from approximately 2.0 mm (0.08 inches) thick at the root to approximately 1.5 mm (0.06 inches) thick at the tip, with a cross section generally as illustrated in FIG. 7c. The brush segment includes an integrally-molded threaded stud adapted for screw-type engagement with a rotary tool as taught by U.S. Pat. No. 3,562,968.

Figure 18:
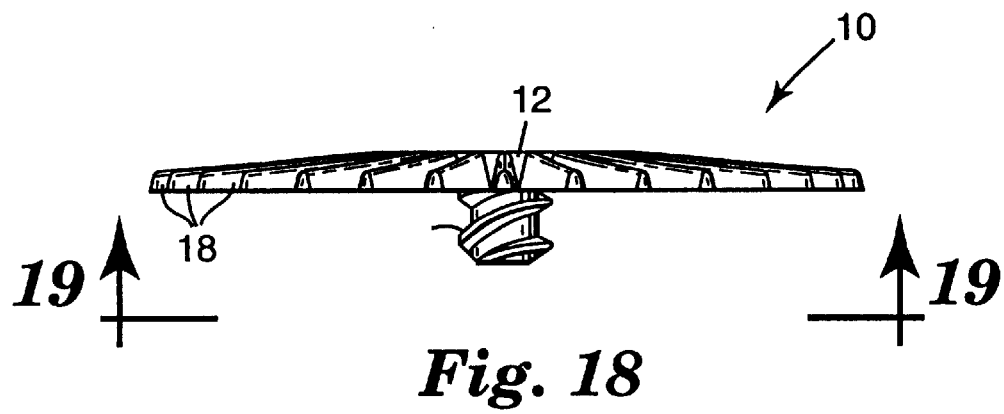
FIG. 18 is an elevational view of a fifth embodiment of a molded brush segment according to the present invention.
Figure 19:
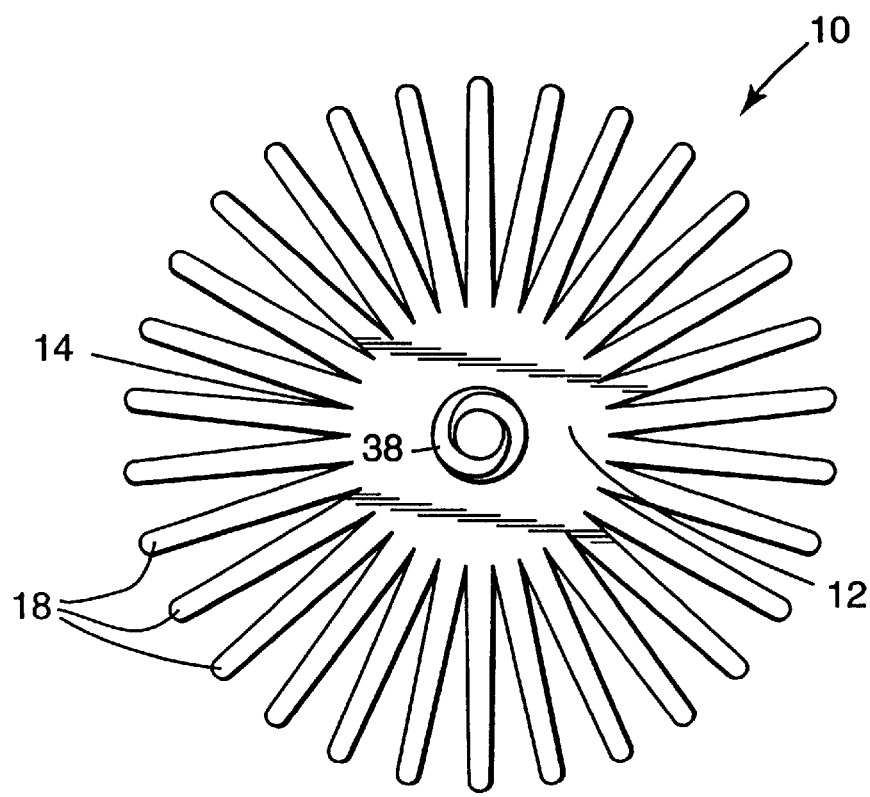
FIG. 19 is a plan view of the molded brush segment of FIG. 18.

FIGS. 18 and 19 illustrate another preferred variation of the embodiment of the brush segment illustrated in FIGS. 11–12. In the embodiment shown in FIGS. 18–19, the center portion 12 of the brush segment 10 has an outer diameter at edge 14 of approximately 2.5 cm (1 inch) and a thickness of approximately 2.5 mm (0.1 inches), with 30 bristles 18 extending radially outward from edge 14 in the plane of the center portion 12. Each bristle 18 is approximately 2.25 cm (0.88 inches) long and tapers from approximately 3.0 mm (0.12 inches) thick at the root to approximately 2.0 mm (0.08 inches) thick at the tip, with a cross section generally as illustrated in FIG. 7c. The just-described dimensions of brush segment 10 and number of bristles 18 are merely exemplary of one preferred embodiment, the present invention is not thereby limited. The brush segment preferably includes an integrally-molded threaded stud 38 adapted for screw-type engagement with a rotary tool as taught by U.S. Pat. No. 3,562,968. It is understood that any other attachment means described herein can be used with this embodiment.

Figure 20:
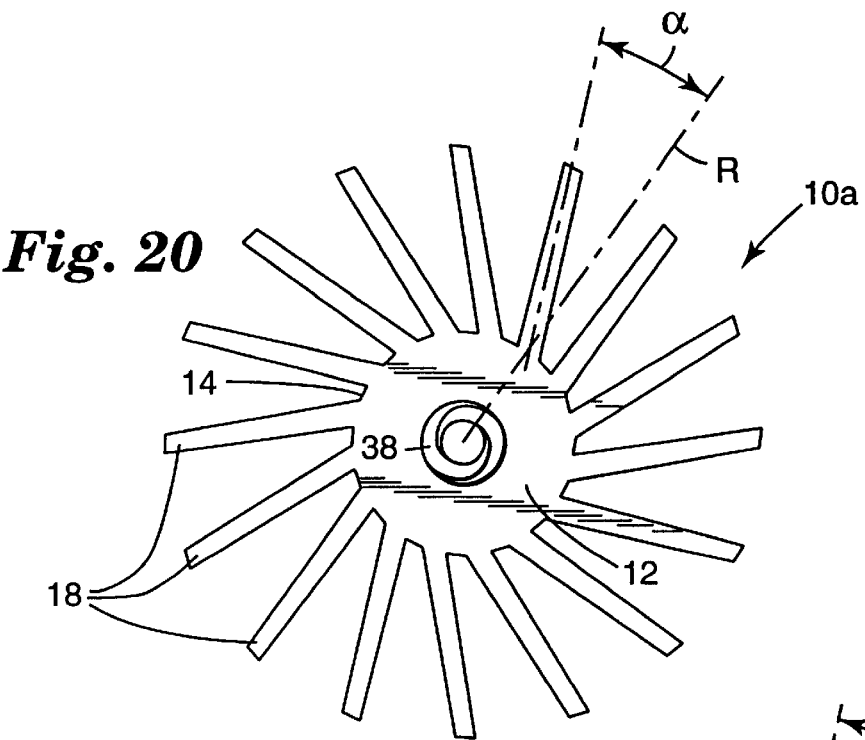
FIG. 20 is a plan view of a sixth embodiment of a molded brush segment according to the present invention in which the bristles are at an angle relative to a radius of the brush.

FIG. 20 illustrates an embodiment of molded brush segment 10a similar to that shown in FIGS. 18–19, except that the bristles 18 are at an angle α relative to radius R in a direction opposite to that of the direction of rotation of the brush segment 10a in operation. Such an arrangement helps minimize breakage of bristles 18 near their root where the bristles join the outer edge 14 of the center portion 12. When the brush segment is rotated and the ends of the bristles contact a workpiece, this tends to bend the bristles in a direction opposite to the direction of rotation. If this bending force is excessive, a bristle 18 may break at its root. When the brush segment 10a of FIG. 20 is rotated about an axis perpendicular to the center portion 12 and passing through the center of attaching means 38, the back-swept bristles 18 will be subject to centrifugal force. This force will cause the bristle 18 to bend in a direction towards the radial line R. This bending caused by centrifugal force acts opposite to the bending caused by the bristle contacting a workpiece. Therefore, the bristle can withstand a greater amount of bending caused by the workpiece than could a bristle that is initially oriented along the radius. Angle α is preferably up to 45°, more preferably between about 5° and 35°, still more preferably between about 10° and 30°, and most preferably approximately 22.5°, although other angles may be used as desired. In one preferred embodiment of the brush segment of FIG. 20, the center portion 12 of the brush segment 10a has an outer diameter at edge 14 of approximately 2.5 cm (1 inch) and a thickness of approximately 2.5 mm (0.1 inches), with 30 bristles 18 extending outwardly from edge 14 in the plane of the center portion 12. Each bristle 18 is approximately 2.25 cm (0.88 inches) long and tapers from approximately 3.0 mm (0.12 inches) thick at the root to approximately 2.0 mm (0.08 inches) thick at the tip, with a generally square cross-section. The just-described dimensions of brush segment 10 and number of bristles 18 are merely exemplary of one preferred embodiment, the present invention is not thereby limited. The brush segment 10 preferably includes an integrally-molded threaded stud 38 adapted for screw-type engagement with a rotary tool as taught by U.S. Pat. No. 3,562,968. It is understood that any other attachment means described herein can be used with this embodiment.

Figure 21:
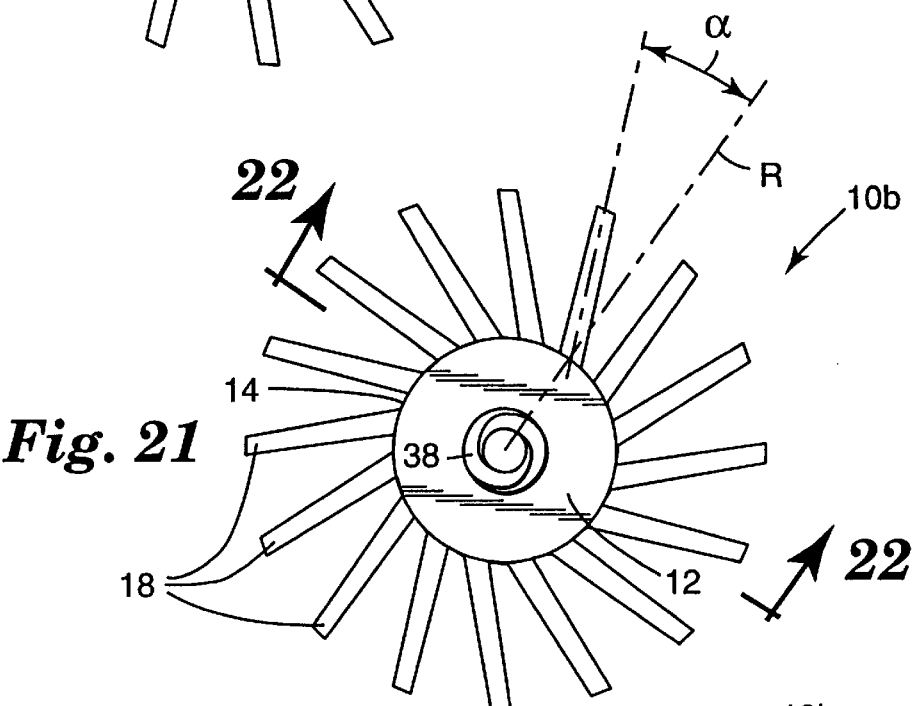
FIG. 21 is a plan view of a seventh embodiment of a molded brush segment according to the present invention in which the bristles are at an angle relative to a radius of the brush segment and in which the bristles are at an angle relative to the center portion of the brush.
Figure 22:
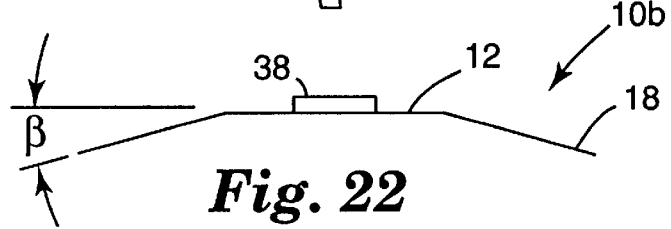
FIG. 22 is a schematic elevational view of the molded brush segment of FIG. 21.

FIGS. 21–22 illustrate an embodiment of molded brush segment 10b similar to that shown in FIG. 20, except that the bristles 18 are at an angle β relative to the plane of the center portion 12 as best seen in FIG. 22. Angle β can be any desired angle, preferably up to about 90°, more preferably between about 10° and 60°, and in one particularly preferred embodiment is about 30°. In the illustrated embodiment, bristles 18 are at an angle α as described above with respect to FIG. 20. Where the bristles are also at an angle β relative to the plane of the center portion, it is useful to define a "radial plane" R to describe angle β. The radial plane is one that includes the axis of rotation of the brush segment 10b. In the illustrated embodiment, the center of rotation is through the center of the attaching means 38. The radial plane also includes a radius of the center portion 12 of the brush segment 10b. In the preferred embodiment illustrated, in which the center portion 12 is planar and perpendicular to the axis of rotation of the brush segment 10b, the radial plane is perpendicular to the center portion and along a radius of the center portion, and is thus seen as a line R in FIG. 21, with the plane extending perpendicular to the page. Each bristle 18 intersects a respective radial plane at the base of the bristle. The bristle is illustrated as being swept-back by angle α relative to its respective radial plane. It is also within scope of the present embodiment for the bristles to extend along the radial plane rather than being swept back.

In one preferred embodiment of the brush segment of FIGS. 21–22, the center portion 12 of the brush segment 10 has an outer diameter at edge 14 of approximately 2.5 cm (1 inch) and a thickness of approximately 2.5 mm (0.1 inches), with 30 bristles 18 extending outwardly from edge 14 of the center portion 12. Each bristle 18 is approximately 2.25 cm (0.88 inches) long and tapers from approximately 3.0 mm (0.12 inches) thick at the root to approximately 2.0 mm (0.08 inches) thick at the tip, with a generally square cross-section. The just-described dimensions of brush segment 10 and number of bristles 18 are merely exemplary of one preferred embodiment, the present invention is not thereby limited. The brush segment preferably includes an integrally-molded threaded stud 38 adapted for screw-type engagement with a rotary tool as taught by U.S. Pat. No. 3,562,968. It is understood that any other attachment means described herein can be used with this embodiment.

It is also within the scope of this invention to use a hook and loop type attachment on center portion 12 to attach the brush segment to a back-up pad of a power rotary tool. Suitable hook-and loop fasteners include those taught in U.S. Pat. No. 5,077,870, "Mushroom-Type Hook Strip for a Mechanical Fastener," (Melbye et al.), incorporated herein by reference, or of the type commercially available as SCOTCHMATE™ from Minnesota Mining and Manufacturing Company, St. Paul, Minn. It is also possible to use a hermaphroditic fastener such as DUAL LOCK™ fastener, available from Minnesota Mining and Manufacturing Company, to secure the molded brush segment to a back up pad. It is also possible to employ intermeshing structured surfaces such as taught in U.S. Pat. No. 4,875,259, "Intermeshing Articles" (Appeldorn), incorporated herein by reference.

It is also within the scope of the present invention to use an attachment system where either the center portion of the molded brush segment or the back-up pad of the drive tool includes a layer of pressure sensitive adhesive, while the other of the brush segment or back-up pad comprises a surface to which the pressure sensitive adhesive may releasably attach with the desired attachment strength. Examples of suitable pressure sensitive adhesives include latex crepe, rosin, acrylic polymers and copolymers such as polybutylacrylate and polyacrylate ester, vinyl ethers such as polyvinyl n-butyl ether, alkyd adhesives, rubber adhesives such as natural rubber, synthetic rubber, chlorinated rubber, and mixtures thereof. The adhesive is selected to provide the desired attachment characteristics. One preferred surface to which the abrasive may be releasably affixed is a vinyl sheet.

Figure 23:
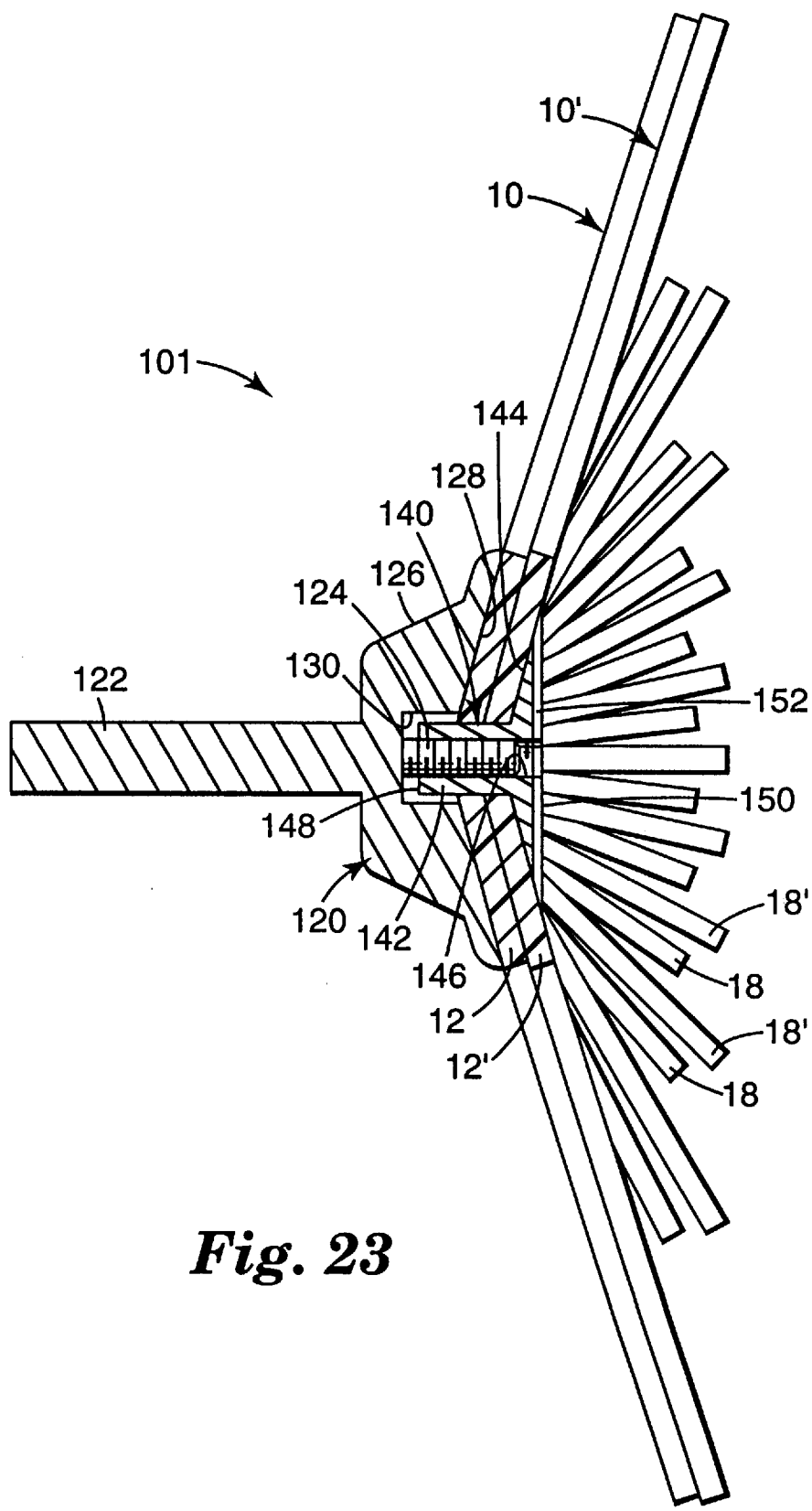
FIG. 23 is a cross sectional view of an alternate brush assembly and holder according to the present invention.

Alternatively, the center portion of the molded brush segment may contain one or more straight or threaded holes or openings so that the abrasive brush segment may be mechanically secured (such as with a bolt and nut) to the back up pad. Such a hole may optionally be fitted with an insert of a different material from that of the central portion of the molded brush segment. One preferred embodiment is illustrated in FIG. 23. While the brush assembly 101 of FIG. 23 is illustrated as including two molded brush segments 10, 10', the assembly can contain any desired number of molded brush segments. For example, the brush assembly 101 may include 1 to 50 molded brush segments 10, typically about 1–20, and preferably 1–10 molded brush segments are included. Where more than one brush segment is included, the bristles 18 of adjacent brush segments can be aligned, offset a predetermined amount, or randomly arranged circumferentially between adjacent brush segments. Also, the bristles or entire brush segments in an assembly 101 may have the same or different configurations, abrasives, and/or moldable polymers.

The brush assembly of FIG. 23 includes holder 120 with nut 140 secured on the holder to secure the desired number of brush segments 10, 10'. Holder 120 includes a shaft 122 suitable for mounting in a rotary power tool. Extending opposite to shaft 122 is threaded shaft 124 for receiving the nut 140. Holder 120 includes a receiving portion 126 for supporting the center portion 12 of the brush segment 10. In the illustrated embodiment, receiving portion 126 includes a tapered inner surface 128 for supporting the brush segment. This can be used with brush segments of like taper, or with fiat brush segments that are flexible enough to conform to the tapered surface 128. Holder 120 also includes cylindrical cavity 130 for receiving the nut 140. Nut 140 is shown in threaded engagement at threaded inner surface 146 with the threaded shaft 124 of holder 120 to secure the brush segments 10, 10' to the holder 120. Nut 140 includes a cylindrical portion 142 sized and configured to hold a desired number of brush segments thereon. Brush segments 10, 10' each include a hole in the center portion 12 which fits over the cylindrical portion 142 of the nut 140. Opposite the cylindrical portion, nut 140 includes a tapered outer surface 144 which is of a taper substantially the same as that of tapered inner surface 128 on the holder. The center portions 12 of the molded brushes 10 are constrained between the tapered outer surface 144 of the nut and the tapered inner surface 128 of the holder. Second end 150 of the nut can include a slot 152 for receiving a tool to tighten the nut against the holder. Alternatively to the illustrated embodiment, the tapered inner surface 128 and tapered outer surface 144 can be perpendicular to the longitudinal axis along shafts 122, 124 of the holder.

To assembly the brush assembly 101 of FIG. 23, the first end 148 of nut 140 is inserted through the hole in the center portion 12 of the desired number of brushes 10. The brushes are then slid along cylindrical portion 142 of the nut until they are adjacent tapered outer surface 144. The threaded inner surface 146 of the nut is then engaged with the threaded shaft 124 of the holder. The nut and holder are rotated relative to one another until the center portions 12 of the molded brushes are securely held between tapered inner surface 128 of holder 120 and tapered outer surface of nut 140.

Reinforcing Means

The center portion 12 may further comprise reinforcing means which can comprise a fiber reinforcing substrate. Reinforcing means can comprise, for example, fabric, non-woven sheeting, mat, mesh, scrim, and the like, or can comprise individual fibers compounded into the moldable polymer and dispersed throughout the brush segment. The reinforcing means may optionally contain a treatment to modify its physical properties. The purpose of the reinforcing means is to increase the flexural strength and tensile strength of the brush segment 10. Examples of reinforcing fibers suitable for use in the present invention include glass fibers, metal fibers, carbon fibers, wire mesh, mineral fibers, fibers formed of heat resistant organic materials, or fibers made from ceramic materials. Ether organic fibers include polyvinyl alcohol fibers, nylon fibers, polyester fibers and phenolic fibers. If glass fibers are used, the moldable polymer mixture may preferably contain a coupling agent, such as a silane coupling agent, to improve the adhesion to the thermoplastic material. The length of the fiber preferably ranges from about 0.5 mm to about 50 mm, preferably about 1 mm to about 25 mm, most preferably about 1.5 mm to about 10 mm. The fiber denier is preferably between about 25 to 300, and more preferably between 50 to 200.

Moldable Polymer

The moldable polymer material 28 is preferably an organic binder material that is capable of being molded, i.e., it is capable of deforming under heat to form a desired shape. The moldable polymer may be a thermoplastic polymer, a thermosetting polymer, a thermoplastic elastomer, or combinations thereof. In the case of a thermoplastic polymer, the organic binder is heated above its melting point which causes the polymer to flow. This results in the thermoplastic polymer flowing into the cavities of the mold to form the brush segment 10. The brush segment is then cooled to solidify the thermoplastic binder. In the case of a thermosetting polymer, during molding the organic binder is in a thermoplastic state, i.e., after it is heated above its melting point it will flow into the cavities of the mold to form the brush segment. Next, the brush segment is further heated, in some instances at a higher temperature, to cause this organic binder to crosslink and form a thermosetting polymer. Examples of suitable thermosetting polymers include styrene butadiene rubber, polyurethane, urea-formaldehyde, epoxy, and phenolics.

Thermoplastic Polymers

The brush segment according to the present invention may comprise a thermoplastic polymer. Examples of suitable thermoplastic polymers include polycarbonate, polyetherimide, polyester, polyethylene, polysulfone, polystyrene, polybutylene, acrylonitrile-butadiene-styrene block copolymer, polypropylene, acetal polymers, polyurethanes, polyamides, and combinations thereof. In general, preferred thermoplastic polymers of the invention are those having a high melting temperature and good heat resistance properties. Thermoplastic polymers may be preferably employed for low speed applications of brush segment 10, in which stress during operation is relatively low. Examples of commercially available thermoplastic polymers suitable for use with the present invention include GRILON CR9 copolymer of NYLON 6,12 available from EMS-American Grilon, Inc., Sumter, South Carolina; Profaxm and KS075 polypropylene based thermoplastic available from Himont USA, Inc., Wilmington, Delaware; and DURAFLEX polybutylene based thermoplastic available from Shell Chemical Co., Houston, Tex.

One particular thermoplastic polymer suitable for use with the present invention is a polyamide resin material, which is characterized by having an amide group, i.e., —C(O)NH—. Various types of polyamide resin materials, i.e., NYLONS can be used, such as NYLON 6/6 or NYLON 6. NYLON 6/6 is a condensation product of adipic acid and hexamethylenediamine. NYLON 6/6 has a melting point of about 264° C. and a tensile strength of about 770 kg/cm$^2$. NYLON 6 is a polymer of $\epsilon$-caprolactam. NYLON 6 has a melting point of about 220° C. and a tensile strength of about 700 kg/cm$^2$. Examples of commercially available NYLON resins useable as backings in articles according to the present invention include "VYDYNE " from Monsanto, St. Louis, MO. "ZYTEL" and "MINION" both from Du Pont, Wilmnington, Del. "TROGANMID" from Huls America, Inc., Piscataway, N.J. "CAPRON" from Allied Chemical Corp., Morristown, N.J. "NYDUR" from Mobay, Inc., Pittsburgh, Pa. and "ULTRAMID" from BASF Corp., Parsippany, N.J.

THERMOPLASTIC ELASTOMERS

In some instances, such as high speed, high stress applications, it is preferred that the moldable polymer is a thermoplastic elastomer or includes a thermoplastic elastomer. Thermoplastic elastomers (or "TPE" s) are defined and reviewed in *Thermoplastic Elastomers, A Comprehensive Review*, edited by N.R. Legge, G. Holden and H. E. Schroeder, Hanser Publishers, New York, 1987 (referred to herein as "Legge et al.", the entire disclosure of which is incorporated by reference herein). Thermoplastic elastomers (as used herein) are generally the reaction product of a low equivalent weight polyfinctional monomer and a high equivalent weight polyfunctional monomer, wherein the low equivalent weight polyfunctional monomer has a functionality of at most about 2 and equivalent weight of at most about 300 and is capable on polymerization of forming a hard segment (and, in conjunction with other hard segments, crystalline hard regions or domains) and the high equivalent weight polyfunctional monomer has a functionality of at least about 2 and an equivalent weight of at least about 350 and is capable on polymerization of producing soft, flexible chains connecting the hard regions or domains. "Thermoplastic elastomers" differ from "thermoplastics" and "elastomers" (a generic term for substances emulating natural rubber in that they stretch under tension, have a high tensile strength, retract rapidly, and substantially recover their original dimensions) in that thermoplastic elastomers, upon heating above the melting temperature of the hard regions, form a homogeneous melt which can be processed by thermoplastic techniques (unlike elastomers), such as injection molding, extrusion, blow molding, and the like. Subsequent cooling leads again to segregation of hard and soft regions resulting in a material having elastomeric properties, however, which does not occur with thermoplastics. Thermoplastic elastomers combine the proccessability (when molten) of thermoplastic materials with the functional performance and properties of conventional thermosetting rubbers (when in their non-molten state), and which are described in the art as ionomeric, segmented, or segmented ionomeric thermoplastic elastomers. The segmented versions comprise "hard segments" which associate to form crystalline hard domains connected together by "soft", long, flexible polymeric chains. The hard domain has a melting or disassociation temperature above the melting temperature of the soft polymeric chains.

Commercially available thermoplastic elastomers include segmented polyester thermoplastic elastomers, segmented polyurethane thermoplastic elastomers, segmented polyamide thermoplastic elastomers, blends of thermoplastic elastomers and thermoplastic polymers, and ionomeric thermoplastic elastomers.

"Segmented thermoplastic elastomer", as used herein, refers to the sub-class of thermoplastic elastomers which are based on polymers which are the reaction product of a high equivalent weight polyfunctional monomer and a low equivalent weight polyfunctional monomer. Segmented thermoplastic elastomers are preferably the condensation reaction product of a high equivalent weight polyfunctional monomer having an average functionality of at least 2 and an equivalent weight of at least about 350, and a low equivalent weight polyfunctional monomer having an average functionality of at least about 2 and an equivalent weight of less than about 300. The high equivalent weight polyfunctional monomer is capable on polymerization of forming a soft segment, and the low equivalent weight polyfunctional monomer is capable on polymerization of forming a hard segment. Segmented thermoplastic elastomers useful in the present invention include polyester TPEs, polyurethane TPEs, and polyamide TPEs, and silicone elastomer/polyimide block copolymeric TPEs, with the low and high equivalent weight polyfunctional monomers selected appropriately to produce the respective TPE.

The segmented TPEs preferably include "chain extenders", low molecular weight (typically having an equivalent weight less than 300) compounds having from about 2 to 8 active hydrogen functionality, and which are known in the TPE art. Particularly preferred examples include ethylene diamine and 1,4-butanediol.

"Ionomeric thermoplastic elastomers" refers to a subclass of thermoplastic elastomers based on ionic polymers (ionomers). Ionomeric thermoplastic elastomers are composed of two or more flexible polymeric chains bound together at a plurality of positions by ionic associations or clusters. The ionomers are typically prepared by copolymerization of a functionalized monomer with an olefinic unsaturated monomer, or direct functionalization of a preformed polymer. Carboxyl-functionalized ionomers are obtained by direct copolymerization of acrylic or methacrylic acid with ethylene, styrene and similar comonomers by free-radical copolymerization. The resulting copolymer is generally available as the free acid, which can be neutralized to the degree desired with metal hydroxides, metal acetates, and similar salts. A review of ionomer history and patents concerning same is provided in Legge et al., pp. 231–243.

"Thermoplastic polymer", or "TP" as used herein, has a more limiting definition than the general definition, which is "a material which softens and flows upon application of pressure and heat." It will of course be realized that TPEs meet the general definition of TP, since TPEs will also flow upon application of pressure and heat. It is thus necessary to be more specific in the definition of "thermoplastic" for the purposes of this invention. "Thermoplastic" as used herein, means a material which flows upon application of pressure and heat, but which does not possess the elastic properties of an elastomer when below its melting temperature.

Blends of TPE and TP materials are also within the invention, allowing even greater flexibility in tailoring mechanical properties of the abrasive filaments of the invention.

Commercially available and preferred segmented polyesters include those known under the trade designations "HYTREL 4056", "HYTREL 5526", "HYTREL 5556", "HYTREL 6356", "HYTREL 7246", and "HYTREL 8238" available from E.I.Du Pont de Nemours and Company, Inc., Wilmington, Del., with the most preferred including HYTREL 5526, HYTREL 5556, and HYTREL 6356. A similar family of thermoplastic polyesters is available under the tradename "RITEFLEX" (Hoechst Celanese Corporation). Still further useful polyester TPEs are those known under the trade designations "ECDEL" from Eastman Chemical Products, Inc., Kingsport, Tenn. "LOMAD", from General Electric Company, Pittsfield, Mass. "ARNITEL" from DSM Engineered Plastics; and "BEXLOY" from Du Pont. Further useful polyester TPEs include those available as "LUBRICOMP" from LNP Engineering Plastics, Exton, Pa., and is commercially available incorporating lubricant, glass fiber reinforcement, and carbon fiber reinforcement.

Commercially available segmented polyamides include those known under the trade designation "PEBAX" and "RILSAN" both available from Atochem Inc., Glen Rock, N.J.

Commercially available segmented polyurethanes include those known under the trade designation "ESTANE", available from B. F. Goodrich, Cleveland, Ohio. Other segmented polyurethanes include those known under the trade designations "PELLETHANE", and "ISOPLAST" from The Dow Corning Company, Midland, Mich., and those known under the trade designation "Morthane" from Morton Chemical Division, Morton Thiokol, Inc.; and those known under the trade designation "ELASTOLLAN" from BASF Corporation.

Thermoplastic elastomers are further described in U.S. Pat. No. 5,427,595 (Pihl et al.), and assigned to the assignee of the present application, the entire disclosure of which is incorporated herein by reference.

Abrasive Particles

In embodiments which include abrasive particles, the optional abrasive particles 26 typically have a particle size ranging from about 0.1 to 1500 micrometers, usually between about 1 to 1000 micrometers, and more preferably between 50 and 500 micrometers. The abrasive particles may be organic or inorganic.

Examples of abrasive particles include fused aluminum oxide, heat treated fused aluminum oxide, ceramic aluminum oxide, heat treated aluminum oxide, silicon carbide, titanium diboride, alumina zirconia, diamond, boron carbide, ceria, aluminum silicates, cubic boron nitride, garnet, silica, and combinations thereof. Preferred fused aluminum oxides include those available commercially pretreated by Exolon ESK Company, Tonawanda, N.Y., or Washington Mills Electro Minerals Corp., North Grafton, Mass. Preferred ceramic aluminum oxide abrasive particles include those described in U.S. Pat. Nos. 4,314,827; 4,623,364; 4,744,802; 4,770,671; 4,881,951; 4,964,883; 5,011,508; and 5,164,348, the contents of all of which are incorporated herein by reference. Preferred alpha alumina-based ceramic abrasive particles comprising alpha alumina and rare earth oxide include those commercially available under the designation CUBITRON 321 from Minnesota Mining and Manufacturing Company, St. Paul, Minn. Also suitable for use with the present invention are shaped abrasive grains such as those taught in U.S. Pat. Nos. 5,009,676; 5,185,012; 5,244,477; and 5,372,620, the contents of all of which are incorporated herein by reference. Other examples of particles useful for this invention include solid glass spheres, hollow glass spheres, calcium carbonate, polymeric bubbles, silicates, aluminum trihydirate, and mullite. The abrasive particle can be any particulate material (inorganic or organic) that when combined with the binder results in a brush segment 10 that can refine a workpiece surface. The selection of the abrasive material will depend in part on the intended application. For example, for stripping paints from a vehicle, it is sometimes preferred to omit abrasive particles from the brush 10. It is sometimes preferred to use a relatively soft abrasive particle when stripping paints so as not to damage the surface underneath the paint. Alternatively, for removing burrs from metal workpieces, it is preferred to use a harder abrasive particle such as alumina. The brush segment of the present invention may include two or more types and/or sizes of abrasive particles in those embodiments that include the optional abrasive particles..

As used herein, the term abrasive particle also encompasses single abrasive particles which are bonded together to form an abrasive agglomerate. Abrasive agglomerates are further described in U.S. Pat. Nos. 4,311,489; 4,652,275; and 4,799,939, the disclosures of all of which are incorporated herein by reference. The abrasive particles of this invention may also contain a surface coating. Surface coatings are known to improve the adhesion between the abrasive particle and the binder. Such surface coatings are described in U.S. Pat. Nos. 5,011,508; 1,910,444; 3,041,156; 5,009,675; 4,997,461; 5,213,591; and 5,042,991, the disclosures of all of which are incorporated herein by reference. In some instances, the addition of the coating improves the abrading and/or processing characteristics of the abrasive particle.

Organic abrasive particles suitable for use with the brush segment of the present invention are preferably formed from a thermoplastic polymer and/or a thermosetting polymer. Organic abrasive particles useful in the present invention may be individual particles or agglomerates of individual particles. The agglomerates may comprise a plurality of the organic abrasive particles bonded together by a binder to form a shaped mass.

When organic abrasive particles are used in the molded brush segment of the present invention, the particles are preferably present in the moldable polymer at a weight percent (per total weight of moldable polymer and organic abrasive particles) ranging from about 0.1 to about 80 weight percent, more preferably from about 3 to about 60 weight percent. The weight percentage depends in part on the particular abrading or brush segment applications.

The size of the organic abrasive particles incorporated into the moldable polymer depends on the intended use of the molded brush segment. For applications requiring cutting or rough finishing, larger organic abrasive particles are preferred, while particles having smaller size are preferred for finishing applications. Preferably, the average diameter of the particles is no more than about ½ the diameter of the bristle, more preferably no more than about ⅓ of the diameter of the bristle.

The organic abrasive particles preferably have an average particle size from about 0.01 to about 500 micrometers, typically between about 0.1 to about 250 micrometers, preferably between about 1 to about 150 micrometers, more preferably between about 5 to about 100 micrometers and most preferably between about 5 to about 75 micrometers. The average particle size is typically measured by the longest dimension.

The organic abrasive particles can have any precise shape or can be irregularly or randomly shaped. Examples of such three dimensional shapes includes: pyramids, cylinders, cones, spheres, blocks, cubes, polygons, and the like. Alternatively, the organic abrasive particles can be relatively flat and have a cross sectional shape such as a diamond, cross, circle, triangle, rectangle, square, oval, octagon, pentagon, hexagon, polygon and the like.

The surface of the organic abrasive particles (a portion of their surface, or the entire surface) may be treated with coupling agents to enhance adhesion to and/or dispersibility in the molten thermoplastic matrix. The organic abrasive particles are not required to be uniformly dispersed in the hardened composition, but a uniform dispersion may provide more consistent abrasion characteristics.

The organic abrasive particles can be formed from a thermoplastic material such as polycarbonate, polyetherimide, polyester, polyvinyl chloride, methacrylate, methylmethacrylate, polyethylene, polysulfone, polystyrene, acrylonitrile-butadiene-styrene block copolymer, polypropylene, acetal polymers, polyurethanes, polyamide, and combinations thereof. In general, preferred thermoplastic polymers of the invention are those having a high melting temperature, e.g. greater than 200° C., more preferably 300° C.; or good heat resistance properties. The organic abrasive particles. should have a higher melting or softening point that the thermoplastic matrix, so that the organic particles are not substantially affected by the filament manufacturing process. The organic particle should be capable of maintaining a generally particulate state during filament or brush segment processing, and therefore should be selected so as not to substantially melt or soften during the filament manufacturing process. In one preferred embodiment, the organic particles are selected to provide greater abrasive properties than the thermoplastic matrix, and both the sheath and core, if present. In this manner, the organic abrasive particles will perform the desired surface refinement, such as removing foreign material from the workpiece or providing a fine surface finish, while the thermoplastic matrix wears away during operation to continuously present fresh organic abrasive particles to the workpiece surface.

There are several ways to form a thermoplastic abrasive particle. One such method is to extrude the thermoplastic polymer into elongate segments and then cut these segments into the desired length. Alternatively, the thermoplastic polymer can be molded into the desired shape and particle size. This molding process can be compression molding or injection molding.

The organic abrasive particles can be formed from a thermosetting polymer. Thermosetting polymers can be formed from: phenolic resins, aminoplast resins, urethane resins, epoxy resins, acrylate resins, acrylated isocyanurate resins, ureaformaldehyde resins, isocyanurate resins, acrylated urethane resins, melamine formaldehyde resins, acrylated epoxy resins and mixtures thereof. Phenolic based abrasive particles are one preferred abrasive particles. There are two types of phenolic resins, resole and novolac. Resole phenolic resins have a molar ratio of formaldehyde to phenol, of greater than or equal to one to one, typically between 1.5:1.0 to 3.0:1.0. Novolac resins have a molar ratio of formaldehyde to phenol, of less than to one to one. Examples of commercially available phenolic resins include those known by the tradenames "DUREZ" and "VARCUM" from Occidental Chemicals Co., Burlington, N.J.; "RESINOX" from Monsanto; "AEROFENE" and "AROTAP" from Ashland Chemical Co., Columbus, Ohio. These phenolic resins are cured to thermosetting polymers. The resulting thermosetting polymers are then crushed to the desired particle size and particle size distribution. In alternative method, the thermosetting organic abrasive particles can be made in accordance with the teachings of the U.S. Pat. No. 5,500,273, "Precisely Shaped Particles and Method of Making Same" ( Holmes et al.).

The U.S. Pat. No. 5,500,273 discloses precisely shaped particles and methods for making these particles. The particles comprise a binder. In one desirable embodiment of the '273 patent, a plurality of abrasive grits is dispersed in the binder.

One preferred method described in the '273 patent comprises the steps of:

(a) providing a production tool having a three-dimensional body which has at least one continuous surface, said surface containing at least one opening formed in said continuous surface, said at least one opening providing access to a cavity in said three-dimensional body;

(b) providing a dispensing means capable of introducing a binder precursor comprising a thermosetting resin into said at least one cavity through said at least one opening;

(c) providing a means, within a curing zone, for at least partially curing said binder precursor, (d) introducing said binder precursor into at least a portion of said at least one cavity;

(e) continuously moving said at least one cavity through said curing zone to at least partially cure said binder precursor to provide a solidified, handleable binder having a shape corresponding to that portion of the cavity into which the binder precursor had been introduced;

(f) removing said binder from said at least one cavity; and (g) converting said binder to form a precisely shaped particle.

Steps (f) and (g) can be conducted simultaneously.

In a preferred embodiment, a plurality of abrasive grits is included with the binder precursor in step (d), and a binder containing abrasive grits is formed in step (e). The binder that contains abrasive grits is removed from the at least one cavity of the production tool in step (f). Materials other than abrasive grits can be included with the binder precursor.

The curing zone can contain a source of thermal energy, a source of radiation energy, or both. Suitable sources of radiation energy include electron beam, visible light, and ultraviolet light. In a variation of the general method, curing can be effected by thermal energy or by a combination of radiation energy and thermal energy.

The binder can be converted into particles by several means. In one means, when the binder is removed from the cavities of the production tool, it is released in the form of individual particles. These particles can contain additional materials or be free of additional materials. A typical material that can be included in these particles is abrasive grits. The resulting particles preferably have shapes that are essentially the same as the shapes of the cavities of the production tool. Thus, the particles have shapes that are determined by the shapes of the cavities of the production tool. In this first means, steps (f) and (g) are accomplished simultaneously, because the shaped particles have their characteristic form when they are released from the cavities of the production tool.

At least one continuous surface of the production tool contains at least one cavity, preferably a plurality of cavities. The solidified, handleable binder precursor will acquire a shape corresponding to the shape of the cavity. A cavity can have any geometric shape such as a pyramid, prism, cylinder, cone, or thin body having opposed polygonal faces. The geometric shapes can be truncated versions of the foregoing. Et is preferred that the sides of the cavities have a slope associated them to allow easier removal of the binder from the production tool.

In one particularly useful embodiment, the binder precursor may contain abrasive grits. The cured binder precursor, i.e., the binder, functions to bond the abrasive grits together to form a precisely shaped abrasive particle. The abrasive grits typically have an average particle size ranging from about 0.1 to 1500 micrometers, preferably from about 1 to about 1300 micrometers, more preferably from about 1 to about 500 micrometers, and most preferably from about 1 to about 150 micrometers. It is preferred that the abrasive grits have a Mohs' hardness of at least about 8, more preferably above 9. Examples of materials of such abrasive grits include fused aluminum oxide, ceramic aluminum oxide, white fused aluminum oxide, heat treated aluminum oxide, silica, silicon carbide, green silicon carbide, alumina zirconia, diamond, ceria, cubic boron nitride, garnet, tripoli, and combinations thereof.

The organic abrasive particle may be a mixture of a thermoplastic polymer and a thermosetting polymer.

A preferred organic abrasive particle is a metal and mold cleaning plastic blast media available commercially as "MC" blast media from Maxi Blast Inc., South Bend, Ind., available with an antistatic coating, but preferably untreated. The "MC" media is a 99% melamine formaldehyde cellulosate, an amino thermoset plastic.

The average knoop hardness of the organic abrasive particle is generally less than about 80 KNH, and preferably less than about 65 KNH.

It is also within the scope of this invention to incorporate inorganic based abrasive particles along with the organic abrasive particles. These inorganic abrasive particles typically have a particle size ranging from about 0.01 to 500 micrometers, usually between about 1 to 150 micrometers. In certain cases, it is usually preferred that the inorganic abrasive particles are either the same size or smaller than the organic abrasive particles. It is preferred that the abrasive particles have a Mohs hardness of at least about 7, more preferably above 9. For example, the molded brush segment may comprise between 10 to 90% by weight moldable polymer, between 10 to 90% by weight organic abrasive particles and between 0 to 49% by weight inorganic abrasive particles.

When present, optional abrasive particles 26 are typically from about 0.1 to 75 percent by weight of the particle and polymer mixture, preferably from about 3 to 60 percent, more preferably about 5 to 50 percent, and still more preferably about 20 to 35 percent, although more or less may be used as desired. For some surface refinement applications, it is desirable that the molded brush segment 10 comprises a moldable polymeric material 28 without abrasive particles 26.

Additives

The moldable polymeric material 28 may further include optional additives, such as, for example, fillers (including grinding aids), fibers, antistatic agents, antioxidants, processing aids, UV stabilizers, flame retardants, lubricants, wetting agents, surfactants, pigments, dyes, coupling agents, plasticizers, and suspending agents. The amounts of these materials are selected to provide the properties desired.

Lubricants

For some refining applications, it is preferred that the moldable polymer 28 include a lubricant. The presence of a lubricant in the moldable polymer 28 reduces the friction of the bristle contacting the workpiece surface. This reduces the heat generated when refining the workpiece. Excessive heat may cause the brush segment to leave residue or smear on the workpiece or to otherwise harm the workpiece. Suitable lubricants include lithium stearate, zinc stearate, calcium stearate, aluminum stearate, ethylene bis stearamide, graphite, molybdenum disulfide, triglyceride ester, polytetraflouroethylene (PTFE), and silicone compounds, for example useful with thermoplastics and thermoplastic elastomers.

An example of a preferred silicone material, which is described in U.S. Pat. application Ser. No. 08/430,477; entitled "Abrasive Article having a Bond System Comprising a Polysiloxane" (Barber), filed on Apr. 28, 1995, the description of the silicone material being incorporated herein by reference, is a high molecular weight polysiloxane of formula (A):

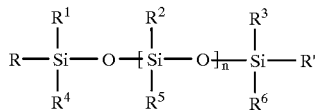

(A)

wherein R, R', $R^1$, $R^2$, $R^3$, $R^4$, $R^5$, and $R^6$ may be the same or different and can be an alkyl, vinyl, chloroalkyl, aminoalkyl, epoxy, fluororalkyl, chloro, fluoro, or hydroxy, and n is 500 or greater, preferably 1,000 or greater, more preferably 1,000 to 20,000, and most preferably 1,000 to 15,000.

Another preferred polysiloxane is a polydimethylsiloxane of formula (B):

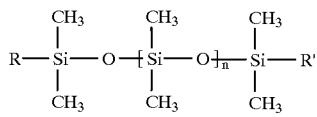

(B)

wherein R and R' may be the same or different and can be an alkyl, vinyl, chloroalkyl, aminoalkyl, epoxy, fluororalkyl, chloro, fluoro, or hydroxy, and n is 500 or greater, preferably 1,000 or greater, more preferably 1,000 to 20,000, and most preferably 1,000 to 15,000.

Polysiloxanes are available in many different forms, e.g., as the compound itself or as a concentrate. Examples of the polymers into which the polysiloxane can be compounded include polypropylene, polyethylene, polystyrene, polyamides, polyacetal, acrylonitrile-butadiene-styrene (ABS), and polyester elastomer, all of which are commercially available. Silicone modified HYTREL is available commercially as MB50-010, and silicone modified Nylon 6,6 is available commercially as MB50-005, both from Dlow Corning Company. Typically, commercially available concentrates may contain a polysiloxane at a weight percent ranging from 40 to 50; however, any weight percent is acceptable for purposes of the invention as long as the desired weight percent in the final product can be achieved. Lubricants preferably can be present in the moldable polymer 26 in amounts of up to about 20 percent by weight (exclusive of abrasive particle content), and preferably in an amount from about 1 to 10 percent, although more or less may be used as desired.

Coupling Agent

The moldable polymeric material 28 may include a coupling agent to improve the bond between the binder and the abrasive particles as is known in the art. Examples of such coupling agents suitable for this invention include organo silanes, zircoaluminates and titanates. Preferred silane coupling agents, typically amine functional such as gamma-aminopropyltriethoxysilane, are commercially available as A-1100, or 1102 from Union Carbide Corporation, New York, N.Y. The abrasive particles 26 may be pretreated with a coupling agent prior to being mixed with the moldable polymer. Alternatively, the coupling agent may be added directly to the moldable polymer 28.

Fillers

The moldable polymeric material 28 may include a filler as is known in the art. Examples of usefull fillers for this invention include: metal carbonates (such as calcium carbonate (chalk, calcite, marl, travertine, marble and limestone), calcium magnesium carbonate, sodium carbonate, magnesium carbonate), silica (such as quartz, glass beads, glass bubbles and glass fibers), silicates (such as talc, clays, (montmorillonite) feldspar, mica, calcium silicate, calcium metasilicate, sodium aluminosilicate, sodium silicate), metal sulfates (such as calcium sulfate, barium sulfate, sodium sulfate, aluminum sodium sulfate, aluminum sulfate), gypsum, vermiculite, wood flour, aluminum trihydrate, carbon black, metal oxides (such as calcium oxide (lime), aluminum oxide, titanium dioxide), and metal sulfites (such as calcium sulfite). In some instances, the filler may serve as an abrasive particle. Fillers can be used with or without abrasive particles.

Grinding Aids

The polymeric material may further include a grinding aid. A grinding aid is defined herein as particulate material that the addition of which has a significant effect on the chemical and physical processes of abrading which results in improved performance. In particular, it is believed in the art that the grinding aid will either (1) decrease the friction between the abrasive particles and the workpiece being abraded, (2) prevent the abrasive particle from "capping", i.e. prevent metal particles from becoming welded to the tops of the abrasive particles, (3) decrease the interface temperature between the abrasive particles the workpiece, or (4) decrease the grinding forces. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, magnesium chloride. Examples of metals include, tin, lead, bismuth, cobalt, antimony, cadmium, iron, and titanium. Other miscellaneous grinding aids include sulfur, organic sulfur compounds, graphite and metallic sulfides.

Injection Molding

Figure 13:
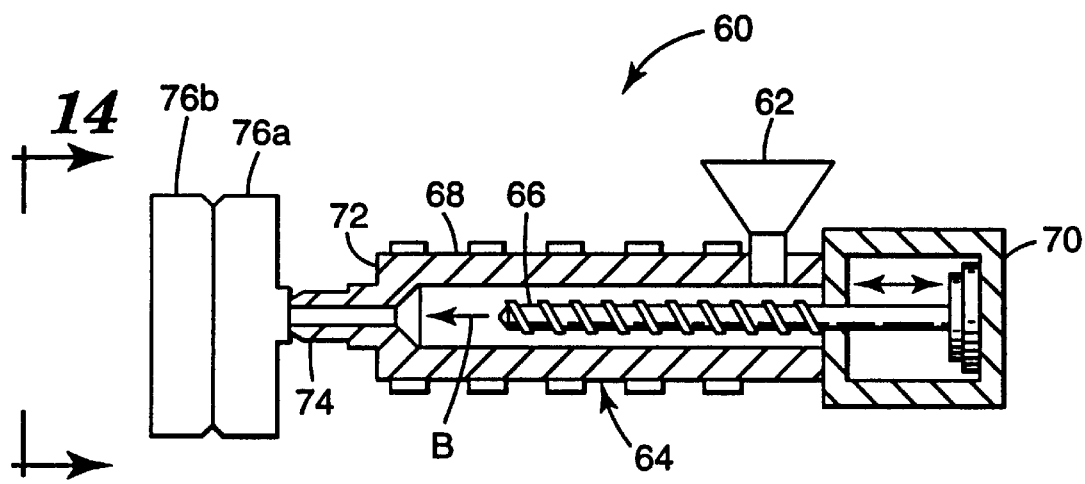
FIG. 13 is a schematic illustration of an apparatus and method for carrying out the present invention.
Figure 14:
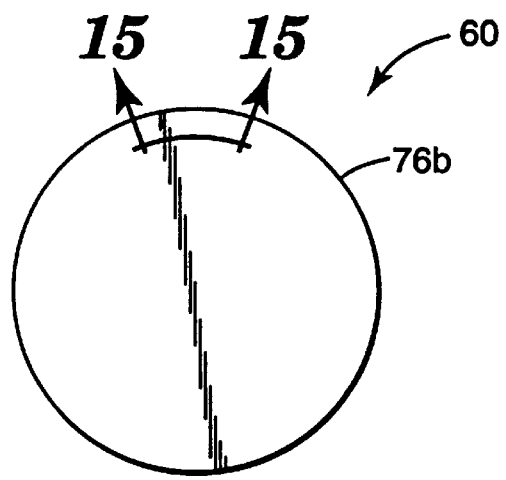
FIG. 14 is an elevational view of the mold of FIG. 13.

The brush segment 10 of the present invention is preferably injection molded. Injection molding techniques are known in the art. Injection molding apparatus 60 for making brush segment 10 according to the method of the present invention is illustrated in FIG. 13. After preferably being dried by heating, a mixture of pellets comprising moldable polymer 28 and, optionally, abrasive particles 26 is placed in a hopper 62. The hopper feeds the mixture into a first or rear side 70 of a screw injector 64 generally comprising a screw 66 within a barrel 68. The opposite side, or front side 72 of screw injector 64 includes nozzle 74 for passing the softened mixture into mold 76a, 76b. Barrel 68 of injector 64 is heated to melt the mixture, and rotating screw 66 propels the mixture in the direction of nozzle 74. Screw 66 is then moved linearly frontward in direction B to impart the "shot" of the softened mixture into mold 76a, 76b at the desired pressure. A gap is generally maintained between the forward end of the screw and the nozzle to provide a "cushion" area of softened material which is not injected into the mold.

Figure 15:
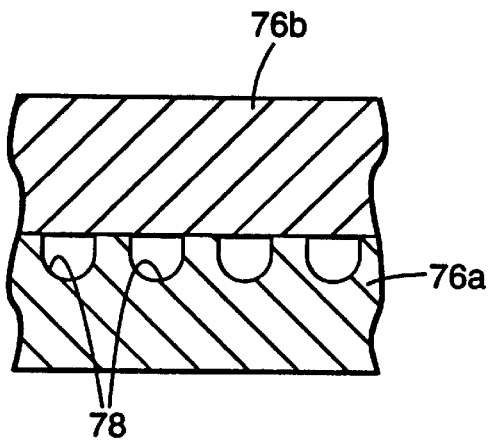
FIG. 15 is a sectional view of a first embodiment of the mold portions of FIG. 13, taken along line 15—15 of FIG. 14.
Figure 16:
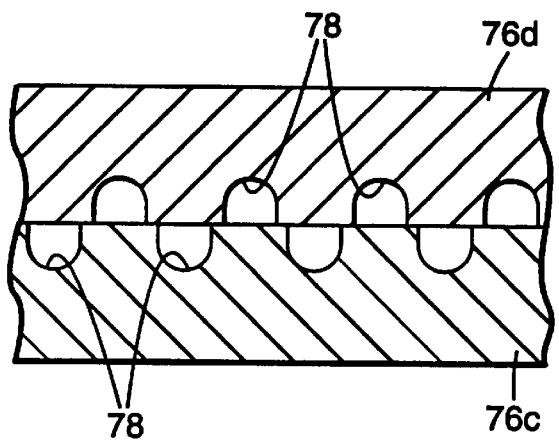
FIG. 16 is a view like FIG. 15 of an alternate embodiment of the mold portions of FIG. 15.

The mold 76a, 76b will contain cavities which are the inverse of the desired brush segment configuration. Thus the mold design must take into account the brush segment configuration including the size and configuration of center portion 12, bristles 18, and optional attachment means such as holes 19, root 30, keyway 36, or threaded stud 38. As seen in FIG. 15, mold portion 76a includes cavities 78 for forming bristles 18. The mold embodiment illustrated in FIG. 15 is configured to mold the bristle embodiment illustrated in FIG. 7c. Alternatively, mold portions 76c and 76d illustrated in FIG. 16 can be used to form a double row of staggered bristles 18. Such a bristle arrangement is illustrated in FIG. 17.

The above mentioned pellets can be preferably prepared as follows. Moldable polymer 28 can be heated above its melting point and the optional abrasive particles 26, if desired, can then be mixed in. The resulting mixture is then formed into continuous strands and the strands are cooled to solidify the moldable polymer for pelletizing on suitable equipment as is known in the art. Likewise, lubricants and/or other additives to the polymeric material 28 can be included in the formation of the pellets. The pellets comprising moldable polymer 28, abrasive particles 26, and any desired lubricant or other additive are then placed into hopper 62 to be fed into screw extruder 64 as described above. Alternatively, it is possible to mix abrasive particles 26 with pellet form of moldable polymer 28 and load this in the hopper. Such an alternative method helps minimize wear which could be caused to the equipment used to form the pellets of polymeric material if the abrasive particles are incorporated in the pellets. This alternative method may also result in a stronger abrasive brush segment 10 if the polymeric material 28 is subject to fewer heat cycles. Likewise, lubricants and/or other additives to polymeric material 28 can be mixed in prior to being loaded into the hopper.

The conditions under which the brush segment is injection molded are determined by the injection molder employed, the configuration of brush segment 10, and the composition of moldable polymer 28 and abrasive particles 26. In one preferred method, moldable polymer 28 is first heated to between 70 to 120° C., preferably 80 to 100° C. for drying, and is placed in hopper 62 to be gravity fed into the screw feed zone. The barrel temperature of the screw injector is preferably from about 200 to 250° C., more preferably from about 220 to 245° C. The temperature of the mold is preferably from about 50 to 150° C., more preferably from about 100 to 140° C. The cycle time (the time from introducing the mixture into the screw extruder to opening the mold to remove the molded brush segment) will preferably range between 0.5 to 180 seconds, more preferably from about 5 to 60 seconds. The injection pressure will preferably range from about 690 to 6,900 kPa (100 to 1000 psi), more preferably from about 2070 to 4830 IPa (300 to 700 psi).

The injection mold cycle will depend upon the material composition and the brush segment configuration. In one preferred embodiment for making a brush segment, the moldable polymer and abrasive particles are generally homogenous throughout brush segment 10. In such an embodiment, there will be a single insertion or shot of mixture of the polymeric material 28 and abrasive particle 26 to mold brush segment 10, including center portion 12, bristles 18, and the attachment means, if present. Alternatively, bristles 18 may contain abrasive particles 26, but center portion 12 does not. In such an embodiment, there will be two insertions or shots of material. The first insertion will contain a mixture of moldable polymer 28 and abrasive particles 26 to primarily fill the bristle portion of the mold. The second insertion will contain moldable polymer (which may be the same or different from the moldable polymer of the first insertion) without abrasive particles to primarily fill the center portion and root means portions of the mold. Likewise, center portion 12 and bristles 18 may contain abrasive particles 26, while root 30 or threaded stud 38 may not. In this construction there will be two insertions or shot of material. The first insertion will contain a mixture of moldable polymer 28 and abrasive particles 26 to fill the bristle and center portion portions of the mold. The second insertion will contain only a moldable polymer (which may be the same or different from the moldable polymer of the first insertion) to primarily fill the attachment means portion of the mold. It is also possible to use more than one shot to vary the color of different portions of the brush segment if desired, it is also possible to employ three or more shots, for example one each for the bristles, center portion, and attachment means. After injection molding, the mold is cooled to solidify the moldable polymer. The mold halves are then separated to allow removal of molded brush segment 10.

Method of Refining a Surface

As discussed above, molded brush segment 10 and brush assemblies 100, 101 according to the present invention are used to refine a surface by: removing a portion of a workpiece surface; imparting a surface finish to a workpiece; cleaning a workpiece surface, including removing paint or other coatings, gasket material, corrosion, or other foreign material; or some combination of the foregoing. In one preferred embodiment illustrated in FIG. 3b, brush assembly 100 comprises a plurality of brush segments 10 fastened by the attachment means to a shaft 110 and a suitable drive means. Alternatively, the brush segments of FIGS. 11–12 and 18–23 can be mounted to a suitable rotary drive means, such as commercially available right angle grinders. Surface refining can be dry or wet, as with water, lubricant, rust inhibitor, or other suitable liquids as is well known in the art. The brush assembly 100, 101 or segment 10 can be rotated at any suitable speed, preferably in the range of about 100 to 15,000 RPM, although higher or lower speeds can be used as desired. Surface refinement can be performed with any suitable force on the brush assembly or segment, typically from about 0.5 to 100 kg. it should be noted that the bristles 18 are sufficiently flexible and supple that, under many refining operations, contact of the bristle against the workpiece is along a substantial length of the side of the bristle, not merely a small portion of the bristle immediately adjacent the tip 18. By using organic abrasive particles described herein, or by omitting abrasive particles 26, the molded brush segment or brush assembly can be used to remove a foreign material, for example paint, dirt, debris, oil, oxide coating, rust, adhesive, gasket material and the like, from a workpiece surface without removing a significant amount of material from the workpiece itself.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. For example, the moled brush segment according to the present invention may be provided with means for introducing fluid such as coolants, lubricants, and cleaning fluids to the workpiece during operation as is known in the art, such as by openings through the backing or bristles. Thus, the scope of the present invention should not be limited to the exact details and structures described herein, but rather by the structures described by the language of the claims, and the equivalents of those structures.

What is claimed is:

1. An integrally molded brush segment comprising:
    a generally planar center portion having an outer edge; and
    a plurality of bristles extending from said outer edge of said center portion, wherein said bristles have an aspect ratio of at least 2, and wherein said bristles are integrally molded with said center portion;
    wherein said molded brush segment comprises a moldable polymeric material, and wherein said bristles include a plurality of abrasive particles interspersed in said moldable polymeric material.

2. The molded brush segment of claim 1, wherein said bristles have an aspect ratio of at least 10.

3. The molded brush segment of claim 1, wherein said bristles each comprise a root adjacent said center portion and a tip opposite said base, and wherein said bristles are tapered so as to be wider at said root than at said tip.

4. The molded brush segment of claim 1, wherein said bristles are coplanar with said center portion.

5. The molded brush segment of claim 1, further comprising an attachment means provided on said center portion for attaching said brush segment to a drive means.

6. The molded brush segment of claim 5, wherein said center portion further comprises an inner edge, and wherein said attachment means comprises a root integrally molded with said molded brush segment, said root extending from said inner edge and including a neck portion adjacent said inner edge and a base portion remote from said inner edge, said base portion being wider than said neck portion.

7. The molded brush segment of claim 5, wherein said center portion further comprises an inner edge, and wherein said attachment means comprises a keyway formed in said inner edge, said keyway configured to engage with a corresponding key formed in a drive means.

8. The molded brush segment of claim 1, wherein said center portion further includes an inner edge, and wherein said inner edge and said outer edge comprise concentric circles bounding said center portion.

9. The molded brush segment of claim 8, wherein said inner edge is configured to accept a drive shaft therethrough, and said center portion further comprises a mounting hole therein for accepting a locking rod therethrough.

10. The molded brush segment of claim 9, wherein said bristles are coplanar with said center portion and extend radially from said outer edge of said center portion.

11. The molded brush segment of claim 10, wherein said bristles are evenly angularly spaced about said outer edge.

12. The molded brush segment of claim 1, wherein said bristles are oblique to the-plane of said center portion.

13. The molded brush segment of claim 1, wherein said abrasive particles comprise inorganic abrasive particles.

14. The molded brush segment of claim 1, wherein said abrasive particles comprise organic abrasive particles.

15. The molded brush segment of claim 1, wherein said center portion further comprises an inner edge opposite said outer edge, said inner edge and said outer edge each comprising arcuate circular segments comprising an angular size equal to one another and no greater than 180°, said center portion further comprising a first radial edge extending from a first end of said inner edge to a first end of said outer edge, and a second radial edge extending from a second end of said inner edge to a second end of said outer edge.

16. The molded brush segment of claim 15, wherein said angular size equals 180°.

17. The molded brush segment of claim 15, wherein said angular size equals 120°.

18. The molded brush segment of claim 15, wherein said angular size equals 90°.

19. The molded brush segment of claim 1, wherein said abrasive particles are interspersed in said moldable polymeric material throughout said brush segment.

20. The molded brush segment of claim 1, wherein said moldable polymeric material comprises a thermoplastic elastomer.

21. The molded brush segment of claim 1, wherein said center portion is circular, and wherein said bristles are oblique to a radial plane of said center portion intersecting each respective bristle.

22. The molded brush of claim 1, wherein said plurality of abrasive particles comprises a plurality of precisely shaped particles.

23. The molded brush of claim 22, wherein said shaped particles include abrasive grit.

24. An integrally molded brush segment comprising:
    a generally planar center portion having an outer edge;
    a plurality of bristles extending from said outer edge of said center portion, wherein said bristles have an aspect ratio of at least 2, and wherein said bristles are integrally molded with said center portion; and
    an attachment means provided on said center portion for attaching said brush segment to a drive means;
    wherein said molded brush segment comprises a moldable polymeric material, wherein said outer edge is circular, and wherein said attachment means comprises a threaded stud integrally molded with said center portion, and located at the center of said center portion.

25. The molded brush segment of claim 24, wherein said bristles are coplanar with said center portion.

26. The molded brush segment of claim 25, wherein said bristles extend radially from said outer edge of said center portion.

27. The molded brush segment of claim 24, wherein said bristles are oblique to the plane of said center portion.

28. The molded brush segment of claim 24, wherein said bristles are oblique to a radial plane of said center portion intersecting each respective bristle.

29. The molded brush segment of claim 24, wherein said bristles include a plurality of abrasive particles interspersed in said moldable polymeric material.

30. The molded brush of claim 29, wherein said plurality of abrasive particles comprises a plurality of precisely shaped particles.

31. The molded brush of claim 30, wherein said shaped particles include abrasive grit.

32. The molded brush segment of claim 24, wherein said moldable polymeric material comprises a thermoplastic elastomer.

33. An integrally molded brush segment comprising:
a generally planar center portion having an outer edge; and
a plurality of bristles extending from said outer edge of said center portion, wherein said bristles have an aspect ratio of at least 2, and wherein said bristles are integrally molded with said center portion;
wherein said molded brush segment comprises a moldable polymeric material, wherein said bristles are oblique to the plane of said center portion, wherein said center portion is circular, and wherein said bristles are oblique to a radial plane of said center portion intersecting each respective bristle.

34. The molded brush segment of claim 33, wherein said bristles include a plurality of abrasive particles interspersed in said moldable polymeric material.

35. The molded brush of claim 34, wherein said plurality of abrasive particles comprises plurality of precisely shaped particles.

36. The molded brush of claim 35, wherein said shaped particles include abrasive grit.

37. The molded brush segment of claim 33, wherein said moldable polymeric material comprises a thermoplastic elastomer.

38. The molded brush segment of claim 33, further comprising an attachment means provided on said center portion for attaching said brush segment to a drive means.

39. The molded brush segment of claim 38, wherein said outer edge is circular, and wherein said attachment means comprises a threaded stud integrally molded with said center portion, and located at the center of said center portion.

40. An integrally molded brush segment comprising:
a generally planar center portion having an outer edge; and
a plurality of bristles extending from said outer edge of said center portion, wherein said bristles have an aspect ratio of at least 2, and wherein said bristles are integrally molded with said center portion;
wherein said molded brush segment comprises a moldable polymeric material, wherein said center portion is circular, and wherein said bristles are oblique to a radial plane of said center portion intersecting each respective bristle.

41. The molded brush segment of claim 40, wherein said bristles include a plurality of abrasive particles interspersed in said moldable polymeric material.

42. The molded brush of claim 41, wherein said plurality of abrasive particles comprises a plurality of precisely shaped particles.

43. The molded brush of claim 42, wherein said shaped particles include abrasive grit.

44. The molded brush of claim 43, wherein said plurality of abrasive particles comprises plurality of precisely shaped particles.

45. The molded brush of claim 44, wherein said moldable abrasive grit.

46. The molded brush segment of claim 16, wherein said moldable polymeric material comprises a thermoplastic elastomer.

47. The molded brush segment of claim 40, further comprising an attachment means provided on said center portion for attaching said brush segment to a drive means.

48. The molded brush segment of claim 17, wherein said attachment means comprises a threaded stud integrally molded with said center portion, and, located at the center of said center portion.

49. An integrally molded brush segment comprising:
a generally planar center portion having an outer edge: and
a plurality of bristles extending from said outer edge of said center portion wherein said bristles have an aspect ratio of at least 2, and wherein said bristles are integrally molded with said center portion:
wherein said molded brush segment comprises a thermoplastic elastomer.

50. The molded brush segment of claim 49, wherein said thermoplastic elastomer is selected from the group consisting essentially of: polyester-based thermoplastic elastomer, nylon-based thermoplastic elastomer, and polyurethane-based thermoplastic elastomer.

51. The molded brush segment of claim 50, wherein said thermoplastic elastomer comprises a polyester based thermoplastic elastomer.

52. The molded brush segment of claim 49, wherein said bristles include a plurality of abrasive particles interspersed in said thermoplastic elastomer.

53. The molded brush segment of claim 52, wherein said abrasive particles are interspersed in said thermoplastics elastomer throughout said brush segment.

54. The molded brush of claim 49, wherein said bristles include a plurality of abrasive particles interspersed in said thermoplastic elastomer.

55. The molded brush segment of claim 49, wherein said bristles are coplanar with said center portion.

56. The molded brush segment of claim 49, wherein said bristles are coplanar with said center portion and extend radially from said outer edge of said center portion.

57. The molded brush segment of claim 49, wherein said bristles are oblique to the plane of said center portion.

58. The molded brush segment of claim 49, wherein said center portion is circular, and wherein said bristles are oblique to a radial plane of said center portion intersecting each respective bristle.

59. An integrally molded brush segment comprising:
a generally planar center portion having inner and outer edges defining concentric circles; said inner edge defining a circular hole in said center portion; and
a plurality of bristles extending radially from said outer edge of said center portion, wherein said bristles are coplanar with said center portion, have an aspect ratio of at least 2, and are integrally molded with said center portion;
wherein said molded brush segment comprises a polymeric thermoplastic elastomer including abrasive particles interspersed throughout.

60. The molded brush segment of claim 59, further comprising an attachment means provided on said center portion for attaching said brush segment to a drive means edge, and wherein said attachment means comprises a root integrally molded with said molded brush segment, said root extending from said inner edge and including a neck portion adjacent said inner edge and a base portion remote from said inner edge, said base portion being wider than said neck portion.

61. The molded brush segment of claim 59, further comprising an attachment means provided on said center portion for attaching said brush segment to a drive means, wherein said attachment means comprises a keyway formed in said inner edge, said keyway configured to engage with a corresponding key formed in a drive means.

62. An integrally molded brush segment comprising:
 a generally planar center portion having a circular outer edge;
 a plurality of bristles extending radially from said outer edge of said center portion, wherein said bristles are coplanar with said center portion, have an aspect ratio of at least 2, and are integrally molded with said center portion; and
 an attachment means provided at the center of said center portion for attaching said brush segment to a drive means;
 wherein said molded brush segment comprises a polymeric thermoplastic elastomer including abrasive particles interspersed at least throughout said bristles.

63. The molded brush segment of claim 62, wherein said attachment means comprises a threaded stud integrally molded with said center portion, and located at the center of said center portion.

64. An integrally molded brush segment comprising:
 a generally planar center portion having a circular outer edge;
 a plurality of bristles extending from said outer edge of said center portion, wherein said bristles are oblique to a respective radial plane of said center portion extending through said bristles, are oblique to the plane of said center portion, have an aspect ratio of at least 2, and are integrally molded with said center portion; and
 an attachment means provided at the center of said center portion for attaching said brush segment to a drive means;
 wherein said molded brush segment comprises a polymeric thermoplastic elastomer.

65. The molded brush segment of claim 64, wherein said bristles include a plurality of abrasive particles interspersed in said polymeric thermoplastic elastomer.

66. The molded brush segment of claim 65, wherein said abrasive particles are interspersed in said thermoplastic elastomer throughout said brush segment.

67. The molded brush of claim 65, wherein said plurality of abrasive particles comprises a plurality of precisely shaped particles.

68. The molded brush of claim 67, wherein said shaped particles include abrasive grit.

69. The molded brush segment of claim 64, wherein said attachment means comprises a threaded stud integrally molded with said center portion.

70. An integrally molded brush segment comprising:
 a generally planar center portion; wherein said center portion includes inner and outer edges each comprising arcuate circular segments comprising an angular size equal to one another and no greater than 180°, a first radial edge extending from a first end of said inner edge to a first end of said outer edge, and a second radial edge extending from a second end of said inner edge to a second end of said outer edge; and
 a plurality of bristles extending radially from said outer edge of said center portion, wherein said bristles are coplanar with said center portion, have an aspect ratio of at least 2, and are integrally molded with said center portion;
 wherein said molded brush segment comprises a polymeric thermoplastic elastomer including abrasive particles interspersed throughout.

71. A brush assembly comprising:
 a) a plurality of molded brush segments, each of said molded brush segments comprising:
  i) a generally planar center portion having an inner edge and an outer edge opposite said inner edge, wherein said inner edge and said outer edge define concentric arcuate edges, respectively;
  ii) a plurality of bristles extending from said outer edge of said center portion, wherein said bristles have an aspect ratio of at least 2, and wherein said bristles are integrally molded with said center portion; and
  iii) attachment means provided on said center portion for attaching said brush segment to a drive means;
 wherein said molded brush segment comprises a moldable polymeric material; and
 b) rotary drive means for rotating said plurality of molded brush segments,
 wherein each of said molded brush segments are mounted to said drive means by said attachment means so that each of said generally planar center portions are parallel to one another.

72. The brush assembly of claim 71, wherein each of said molded brush segments is in contact with an adjacent molded brush segment.

73. The brush assembly of claim 71, wherein said drive means comprises a cylindrical shaft, wherein said inner and outer edges are both circular, wherein said inner edges defines a circular opening for accepting said shaft therethrough, and wherein said center portion extends for 360° around said shaft.

74. The brush assembly of claim 73, wherein said attachment means comprises a root integrally molded with said molded brush segment, said root extending from said inner edge and including a neck portion adjacent said inner edge and a base portion remote from said inner edge, said base portion being wider than said neck portion, and wherein said shaft includes a slot configured to accept said root.

75. The brush assembly of claim 73, wherein said attachment means comprises a keyway formed in said inner edge, and said shaft includes a key configured to engage said keyway.

76. The brush assembly of claim 73, wherein said attachment means comprises a mounting hole formed is said center portion and a locking rod extending therethrough.

77. The brush assembly of claim 71, wherein said attachment means comprises a root integrally molded with said molded brush segment, said root extending from said inner edge and including a neck portion adjacent said inner edge and a base portion remote from said inner edge, said base portion being wider than said neck portion, and wherein said shaft includes a slot configured to accept said root.

* * * * *

UNITED STATES PATENT AND TRADEMARK OFFICE
CERTIFICATE OF CORRECTION

PATENT NO. : 5,903,951
DATED : May 18, 1999
INVENTOR(S) : Richard Ionta et al.

It is certified that error appears in the above-identified patent and that said Letters Patent is hereby corrected as shown below:

Column 3,
Line 17, after "thereof" add -- . --.

Column 5,
Line 63, "TEE" should read -- THE --.

Column 8,
Line 49, "comer" should read -- corner --.

Column 12,
Line 48, "circumferentially" should read -- circumferentialy --.
Line 62, "fiat" should read -- flat --.

Column 14,
Line 12, after "thereof" add -- . --.
Line 22, "profaxm" should read -- Profax$^{TM}$ --.
Line 40, "TROGANMID" should read -- TROGAMID --.
Line 56, "polyfinctional" should read -- polyfunctional --.

Column 22,
Line 4, "Dlow" should read -- Dow --.

Colum 24,
Line 10, "IPa" should read -- KPa --.

Column 25,
Line 1, "it" should read -- It --.

Column 27,
Line 66, insert -- shaped particles include -- between "said" and "abrasive" delete, "moldable".

UNITED STATES PATENT AND TRADEMARK OFFICE
CERTIFICATE OF CORRECTION

PATENT NO.   : 5,903,951
DATED        : May 18, 1999
INVENTOR(S)  : Richard Ionta et al.

It is certified that error appears in the above-identified patent and that said Letters Patent is hereby corrected as shown below:

<u>Column 28,</u>
Line 1, "16" should read -- 40 --.
Line 5, "means-provided" should read -- means provided --.
Line 7, "17" should read -- 49 --.
Line 9, delete "," following "and".

Signed and Sealed this

Fifth Day of November, 2002

Attest:

Attesting Officer

JAMES E. ROGAN
Director of the United States Patent and Trademark Office